(12) United States Patent  
Mizuta et al.

(10) Patent No.: US 7,914,927 B2  
(45) Date of Patent: Mar. 29, 2011

(54) MATERIAL FOR ELECTROLYTIC SOLUTIONS AND USE THEREOF

(75) Inventors: Keiichiro Mizuta, Takatsuki (JP); Yukiko Yamamoto, Osaka (JP)

(73) Assignee: Nippon Shokubai Co., Ltd., Osaka-Shi, Osaka (JP)

( * ) Notice: Subject to any disclaimer, the term of this patent is extended or adjusted under 35 U.S.C. 154(b) by 0 days.

(21) Appl. No.: 12/725,667

(22) Filed: Mar. 17, 2010

(65) Prior Publication Data

US 2010/0173195 A1   Jul. 8, 2010

Related U.S. Application Data

(63) Continuation of application No. 10/402,981, filed on Apr. 1, 2003, now Pat. No. 7,713,658.

(30) Foreign Application Priority Data

Apr. 2, 2002   (JP) ................... 2002-100429

(51) Int. Cl.  
*H01M 6/04* (2006.01)

(52) U.S. Cl. ............... 429/188; 429/499; 324/425

(58) Field of Classification Search .............. 429/14, 429/29, 33, 46, 188, 468, 99, 425, 499; 324/425  
See application file for complete search history.

(56) References Cited

U.S. PATENT DOCUMENTS

| | | | |
|---|---|---|---|
| 3,578,500 A * | 5/1971 | Maricle et al. ............ | 429/105 |
| 4,279,976 A | 7/1981 | Klemann et al. | |
| 4,463,071 A | 7/1984 | Gifford et al. | |
| 4,505,997 A | 3/1985 | Armand et al. | |
| 4,978,770 A | 12/1990 | Aoyagi et al. | |
| 5,506,073 A | 4/1996 | Angell et al. | |

(Continued)

FOREIGN PATENT DOCUMENTS

CN   1324124 A   11/2001

(Continued)

OTHER PUBLICATIONS

MacFarlane D.R. et al, "Lithium-Doped Plastic Crystal Eletrolytes Exhibiting Fast Ion Conduction for Secondary Batteries," Nature Publishing Group, London GB, vol. 402, Dec. 16, 1999, pp. 792-794.

(Continued)

*Primary Examiner* — Patrick Ryan  
*Assistant Examiner* — Ben Lewis  
(74) *Attorney, Agent, or Firm* — Connolly Bove Lodge & Hutz LLP

(57) ABSTRACT

It is an object of the present invention to provide a material for electrolytic solutions suited for use as material in electrolytic solutions serving as ionic conductors in electrochemical devices, such as large-capacity cells or batteries. The present invention is related to a material for electrolytic solutions which comprises, as an essential constituent, an anion represented by the general formula (i):

$$(NC)_a\text{---}(M^1)_b\text{---}\overset{\ominus}{X}\text{---}(M^2)_c\text{---}(CN)_d \qquad (1)$$

wherein X represents at least one element selected from among B, N, O, Al, Si, P, S, As and Se; $M^1$ and $M^2$ are the same or different and each represents an organic linking group; a is an integer of not less than i, and b, c And d each independently is an integer of not less than 0.

6 Claims, 6 Drawing Sheets

U.S. PATENT DOCUMENTS

| | | | |
|---|---|---|---|
| 6,294,289 B1 * | 9/2001 | Fanta et al. | 429/188 |
| 6,461,773 B1 | 10/2002 | Tsujioka et al. | |
| 6,566,015 B1 | 5/2003 | Yamada et al. | |
| 2002/0022181 A1 | 2/2002 | Tsujioka et al. | |
| 2002/0119377 A1 * | 8/2002 | Suzuki et al. | 429/303 |

FOREIGN PATENT DOCUMENTS

| | | |
|---|---|---|
| EP | 0 576 225 A1 | 12/1993 |
| JP | 51-16609 A | 5/1976 |
| JP | 60133670 A | 7/1985 |
| JP | 6-13108 A | 1/1994 |
| JP | 6-119807 A | 4/1994 |
| JP | 2000-508677 | 7/2000 |
| JP | 2002-3478 A | 1/2002 |
| JP | 2002-075443 | 3/2002 |
| JP | 2002-523879 | 7/2002 |
| WO | WO-92/02966 A1 | 2/1992 |
| WO | WO-98/29389 A1 | 7/1998 |
| WO | WO-00/11742 A1 | 3/2000 |
| WO | WO-01/15258 A1 | 3/2001 |
| WO | WO-2004/082059 A1 | 9/2004 |

OTHER PUBLICATIONS

Douglas R. MacFarlane, et al, "Low Viscosity Ionic Liquids Based on Organic Salts of the Dicyanamide Anion," Chemistry Communication, 2001, pp. 1430-1431.

Nobuyuki Koura, et al., "Polyaniline Secondary Cells With Ambient Temperature Molten Salt Electrolytes" Journal of Electrochemistry Society, vol. 140, No. 3, Mar. 3, 1993, pp. 602-605.

C. A. Angell, et al., "Rubbery Solid Electrolytes With Dominant Cationic Transport and High Ambient Conductivity" Nature, vol. 362, Mar. 11, 1993, pp. 137-139.

* cited by examiner (a)

(b)

US 7,914,927 B2

MATERIAL FOR ELECTROLYTIC SOLUTIONS AND USE THEREOF

This application is a Continuation of U.S. application Ser. No. 10/402,981, now U.S. Pat. No. 7,713,658 filed Apr. 1, 2003, which claims priority to Japanese Patent Application number 2002-100429, filed on Apr. 2, 2002. The entire contents of each of the above-applications are incorporated herein by reference

FIELD OF THE INVENTION

The present invention relates to a material for electrolytic solutions and a use thereof. More particularly, it relates to a material for electrolytic solutions which can judiciously be used in electrolytic solutions serving as ionic conductors in electrochemical devices and to the use thereof in lithium secondary batteries, electrolytic condensers, electric double layer capacitors, and the like.

BACKGROUND OF THE INVENTION

Materials for electrolytic solutions are widely used in various cells or batteries in which the phenomenon of ionic conduction is utilized, for example in primary cells or batteries, lithium (ion) secondary batteries, fuel cells and other cells or batteries having charge and discharge mechanisms as well as in electrolytic condensers, electric double layer capacitors, solar cells, electrochromic display devices and other electrochemical devices. In these, each cell is generally constituted of a pair of electrodes and an electrolytic solution occurring therebetween and serving as an ionic conductor. Currently used as such ionic conductor are electrolytic solutions prepared by dissolving an electrolyte, such as lithium perchlorate, $LiPF_6$, $LiBF_4$, tetraethylammonium fluoroborate or tetramethylammonium phthalate, in an organic solvent such as γ-butyrolactone, N,N-dimethylformamide, ethylene carbonate, propylene carbonate or tetrahydrofuran. In such ionic conductors, the electrolyte, when dissolved, dissociates into a cation and an anion to cause ionic conduction through the electrolytic solution.

With the spread of laptop computers, palmtop computers, mobile phones, video cameras and other portable electronic devices, lightness and powerfulness have been more and more demanded of cells and batteries in which such ionic conductor materials are used. To cope with the growing demand for such cells and batteries and with the accompanying environmental problems, it is becoming more and more important to develop secondary batteries having a long life.

The form of a typical lithium (ion) secondary battery is schematically shown, in cross section, in FIG. 1. Such a lithium (ion) secondary battery has a positive electrode and a negative electrode each formed of a respective active substance, and an electrolytic constituted of an organic solvent and a lithium salt, such as $LiPF_6$, dissolved as a solute in the solvent forms an ionic conductor between the positive and negative electrodes. In that case, during charging, the reaction $C_6Li \rightarrow 6C+Li+e$ occurs on the negative electrode, the electron (e) generated on the negative electrode surface migrates through the electrolytic solution to the positive electrode surface in the manner of ionic conduction. On the positive electrode surface, the reaction $CoO_2+Li+e \rightarrow LiCoO_2$ occurs and an electric current flows from the negative to the positive electrode. During discharging, reverse reactions as compared with those during charging occur, and an electric current runs from the positive to the negative electrode. Lithium (ion) secondary batteries are in use as such secondary batteries, and lithium hexafluorophosphate ($LiPF_6$) is used as an electrolyte salt in most of those lithium (ion) secondary batteries.

However, such an electrolytic solution, which constitutes an electrochemical device, has problems; the organic solvent is readily volatile and has a low flash point, and a liquid leak may readily occur, hence the reliability in long-term use is questioned. Thus, materials which may bring about improvements in these respects have been demanded. Lithium hexafluorophosphate ($LiPF_6$) and like lithium salts are compounds low in thermal stability and readily hydrolyzable. Lithium (ion) batteries in which such salts are used become very complicated in structure and are manufactured by a very expensive process. Furthermore, owing to the sensitivity of such lithium salts, the life and performance of lithium (ion) batteries may be shortened or lowered and, under extreme conditions, such as elevated temperatures, the use thereof may not be allowed.

In the prior art, Koura et al.: J. Electrochem. Soc. (USA), (1993) vol. 140, page 602 discloses the application of an ordinary temperature molten salt, which occurs as a liquid at room temperature. C. A. Angell et al.: Nature (UK), (1993) vol. 362, page 137 discloses, as ordinary temperature molten salts, complexes between an N-butylpyridinium, N-ethyl-N'-methylimidazolium or like aromatic quaternary ammonium halide and an aluminum halide as well as mixtures of two or more lithium salts. However, the former complexes have a problem of corrosion by halide ions, while the latter complexes are thermodynamically unstable supercooled liquids and have a problem in that they solidify with the lapse of time.

On the other hand, imidazolium or pyridium salts of tetrafluoroborate anion, bistrifluoromethanesulfonylimide anion or the like are relatively stable from the electrical viewpoint and have recently become targets of close investigation. However, they are unsatisfactory in performance, for example ionic conductivity and, due to their containing fluorine, they cause the problem of electrode corrosion, for instance. Thus, there is room for contrivance for providing ionic conductor materials improved in fundamental performance.

Douglas R. MacFarlane et al., Chem. Commun. (UK), (2001) pp. 1430-1431, who studies the thermal characteristics, viscosity and qualitative potential stability of N-alkyl-N-methylpyrrolidinium or 1-alkyl-3-methylimidazolium dicyanamide salts, disclose that such dicyanamide salts are useful as low-viscosity ionic liquids. However, there is no disclosure about the technology of applying such dicyanamide salts as ionic conductor materials in electrochemical devices. Thus, there is room for contrivance for providing ionic conductor materials improved in fundamental performance.

J P Kohyo 2002-523879 (pages 1-7 and 30-43), which is concerned with cyano-substituted salts including cyano-substituted methides and amides, discloses an electrolyte comprising a matrix material and at least one salt selected from the group consisting of N-cyano-substituted amides, N-cyano-substituted sulfonamides, 1,1,1-dicyano-substituted sulfonylmethides and 1,1,1-dicyanoacylmethides. For obtaining this electrolyte, a powder form of such a salt is prepared and this is dissolved in an organic solvent, which is a matrix material, to give a liquid electrolyte, or used to give a solid polymer electrolyte. In the pamphlet of Laid-open International Patent Application WO 01/15258 (pages 14-17), which is concerned with solid conductive materials containing an ionic dopant to serve as a conductive species in an organic matrix, there is disclosed, among others, a material in which N-methyl-N-propylpyrrolidinium dicyanamide salt is used as the organic matrix and $LiSO_3CF_3$ as the ionic dopant. However, these technologies do not include any disclosure about the application of such a compound in salt form as a material in electrolytic solutions to serve as good ionic conductors in electrochemical devices and about the use of such salt itself in a liquid form. Thus, there is room for contrivance for utilizing compounds having ionic conductivity as materials constituting electrolytic solutions capable of exhibiting excellent basic performance.

J P Kohyo 2000-508677 (pages 1-12), which is concerned with ionic compounds containing an anionic moiety bound to a cationic moiety $M^{+m}$, discloses that those ionic compounds in which the cationic moiety M is hydroxonium, nitrosonium $NO^+$, ammonium $NH_4^+$, a metal cation having a valency of m, an organic cation having a valency of m or an organometallic cation having a valency of m and the anionic moiety corresponds to the formula $R_D-Y-C(C\equiv N)_2^-$ or $Z-C(C\equiv N)_2^-$ can be used as ionic conductor materials, for instance. In such ionic compounds, however, the atom (C) is the only anion-constituting element in the anionic moiety. Thus, there is room for contrivance for modifying them to provide materials suited for use in constituting electrolytic solutions showing excellent basic performance.

U.S. Pat. No. 4,505,997 and WO 92/02966 disclose the technology of using lithium bis(trifluoromethylsulfonyl)imide and lithium tris(trifluoromethylsulfonyl)methanide salts as electrolyte salts in cells or batteries. These salt compounds both show a high level of anode stability and form highly conductive solutions together with an organic carbonate. However, lithium bis(trifluoromethylsulfonyl)imide does not passivate the aluminum metal functioning as a cathode terminal conductor to a satisfactory extent. Thus, there is room for contrivance in this respect.

Meanwhile, J P Kohyo 2002-523879 (pages 1-7, 20-22 and 30-43), which is concerned with electrolytes comprising an N-cyano-substituted amide salt or the like and a matrix material, discloses that another known conductive salt may be added to cell or battery electrolyte compositions. However, none of these prior art organic materials is electrochemically stable even under application of a high voltage. Thus, there is room for contrivance for modifying them to give materials suited for use as ionic conductive organic materials.

SUMMARY OF THE INVENTION

Accordingly, it is an object of the present invention, which has been made in view of the above-mentioned state of the art, to provide a material for electrolytic solutions which can improve the ionic conductivity, prevent the corrosion of electrodes and so on and remain stable in a time-independent manner, and is electrochemically stable even at high voltage levels, hence is suited for use as material in electrolytic solutions serving as ionic conductors in electrochemical devices, such as large-capacity cells or batteries.

The present inventors made various investigations to develop a material constituting an electrolytic solution, which is an ionic conductor, and, as a result, paid their attention to the fact that an ionic conductor in liquid form, which is prepared by dissolving an electrolyte in a molten salt is useful, since the resulting salt form no more shows volatility and can be handled safely and that when an anion having a particular structure is used as an essential constituent, the resulting material is excellent in ionic conductivity, hence suited for use as an ionic conductor material, and they found that owing to its containing no fluorine atoms, such material can prevent the corrosion of electrodes and so forth and is excellent in water resistance, hence can function stably in a time-independent manner and thus function as a liquid material for constituting electrolytic solutions. They further found that when the material contains an alkali metal salt, such as a lithium salt, and/or an alkaline earth metal salt, the material is suited for use as a material for use in constituting electrolytic solutions of lithium ion batteries and the like. They thus succeeded in accomplishing the object mentioned above. Further, they realized that when the material contains an ionic liquid and an alkali metal salt and/or an alkaline earth metal salt and the viscosity of the resulting mixture is reduced to a certain specific level or below, it becomes very suited for use as a liquid material for constituting electrolytic solutions in electrochemical devices; they thus succeeded in accomplishing the above object based on such finding as well. Furthermore, they found that when it contains an alkali metal salt, such as a lithium salt, and/or an alkaline earth metal salt or the proton, the material is suited for use as an ionic conductor in lithium ion batteries, fuel cells and the like and that when it is in the form comprising an organic compound comprising an onium cation having a specific structure, the material occurs as an ordinary temperature molten salt capable of stably retaining its molten state at ordinary temperature and, owing to its containing no solvent, it will not evaporate and escape to the outside, hence it serves as a material for constituting electrolytic solutions of electrochemical devices, rendering them usable in a time-independent manner. They also found that the organic solvent-containing form can provide more improved ionic conductivity and that when it has at least a specific level of ionic conductivity at 0° C., the material can be useful as a material constituting electrolytic solution in the field of electrochemical devices. Based on these findings, the present invention has now been completed.

Thus, the present invention provides a material for electrolytic solutions which comprises, as an essential constituent, an anion represented by the following general formula (1):

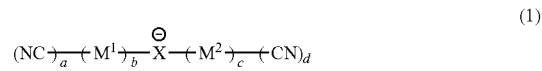

(1)

wherein X represents at least one element selected from among B, N, O, Al, Si, P, S, As and Se; $M^1$ and $M^2$ are the same or different and each represents an organic linking group; a is an integer of not less than 1, and b, c and d each independently is an integer of not less than 0.

The present invention also provides a material for electrolytic solutions which comprises an ionic liquid and an alkali metal salt and/or an alkaline earth metal salt and in which the mixture of the ionic liquid and the alkali metal salt and/or alkaline earth metal salt in the above-mentioned material for electrolytic solutions shows a viscosity of not higher than 300 mPa·s.

DETAILED DESCRIPTION OF THE INVENTION

In the following, the present invention is described in detail.

The material for electrolytic solutions according to the present invention comprises an anion represented by the above general formula (1) as an essential constituent. Thus, it comprises a compound comprising the anion of the general formula (1) as an essential moiety thereof. The above-mentioned anion may comprise one single species or two or more species.

The material for electrolytic solutions according to the present invention can judiciously be used as a medium (solvent) and/or an electrolyte, which is a material for constituting electrolytic solutions in electrochemical devices. In the material for electrolytic solutions according to the present invention, the material is suited for use as a material of the electrolyte constituting electrolytic solutions and the effects of the present invention can be produced to its full extent. In the practice of the present invention, the compound having the anion of the general formula (1) as an essential moiety thereof preferably occurs as a liquid having fluidity and a certain specified volume at room, temperature (25° C.), specifically a liquid having a viscosity of not more than 300 mPa·s, more preferably not more than 200 mPa·s, still more preferably not more than 100 mPa·s, at room temperature (25° C.).

Referring to the above-mentioned general formula (1), X represents at least one element selected from among B, N, O, Al, Si, P, S, As and Se. N (nitrogen atom) is preferred among others. $M^1$ and $M^2$ are the same or different and each represents an organic linking group independently selected from among —S—, —O—, —SO$_2$— and —CO—, and preferably is —SO$_2$— or —CO—. a is an integer of not less than 1, and b, c and d each is an integer of not less than 0. The values of a and d are determined by the valency of the element X. When X is a sulfur atom, for instance, a=1 and d=0. When X is a nitrogen atom, a=2 and d=0, or a=1 and d=1. In preferred embodiments of the present invention, the dicyanamide anion is preferred as the essential constituents, among others.

Suited for use as the compound having the anion of the general formula (1) as an essential constituent are compounds formed from an anion represented by the general formula (1) and a proton; organic salts of an anion represented by the general formula (1); and inorganic salts of an anion represented by the general formula (1).

When the compound having the anion of the general formula (1) as an essential constituent is an organic salt of the anion of the general formula (1), the material for electrolytic solutions according to the present invention provides a suitable molten salt and, when it is an inorganic salt of the anion of the general formula (1), the material becomes suitable as an electrolyte. The term "molten salt" as used herein means a salt capable of retaining its liquid state stably within the temperature range of from room temperature to 80° C.

The proportion, or abundance, of such anion in the material for electrolytic solutions according to the present invention is preferably such that the compound having the anion of the general formula (1) as an essential constituent accounts for not less than 1% by mass but not more than 99.5% by mass, more preferably not less than 5% by mass but not more than 95% by mass, still more preferably not less than 10% by mass but not more than 90% by mass, relative to 100% by mass of the material for electrolytic solutions.

The material for electrolytic solutions according to the present invention preferably comprises an organic compound having an onium cation. Such onium cation-containing organic compound may be a compound having the anion of the general formula (1) as an essential constituent in accordance with the present invention (when the onium cation is the cation forming an organic salt of the anion of the above-mentioned general formula (1)), or another compound separately added, or may comprise both of them.

The material for electrolytic solutions which contains such onium cation and such anion of the general formula (1) can occur as an ordinary temperature molten salt capable of stably retaining its molten state at ordinary temperature, hence can serve as an adequate material of ionic conductors in electrochemical devices and can endure a prolonged period of use. In a preferred embodiment of the present invention, the material contains such ordinary temperature molten salt of the anion of the general formula (1). Thus, the material for electrolytic solutions according to the present invention is suited for use as a material of ionic conductors in which the novel molten salt is used.

Suitable as the above-mentioned onium cation are onium cations represented by the following general formula (2):

(2)

wherein L represents Si, N, P, S or O, the R groups may be the same or different and each is an organic group or may be bonded together, and s is 3, 4 or 5 and is a value determined by the valency of the element L. Specifically, onium cations represented by the following general formula (3):

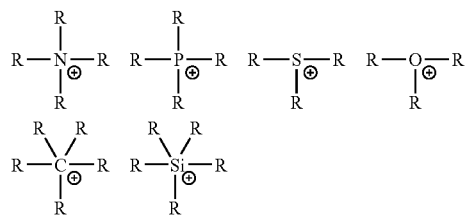
(3)

wherein the R groups are as defined in the general formula (2), are preferred. Such onium cations may be used singly or two or more of them may be used in combination.

Among these, the following onium cations are preferred:

(1) Eleven heterocyclic onium cations represented by the following general formula (4):

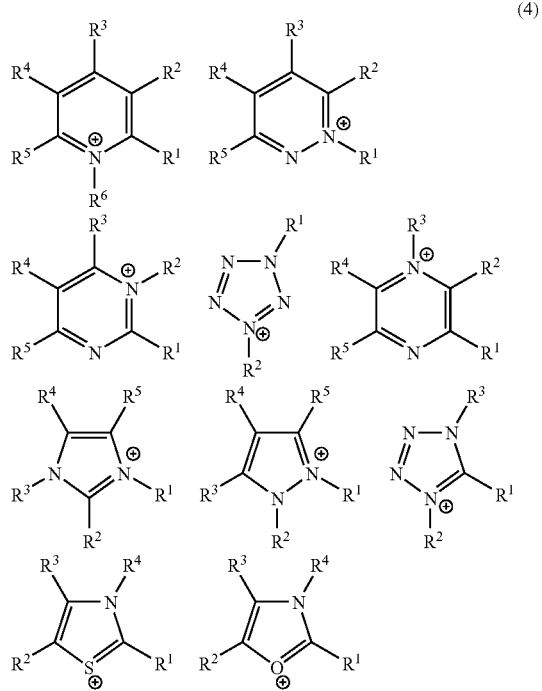
(4)

-continued

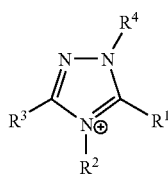

(2) Five unsaturated onium cations represented by the general formula (5):

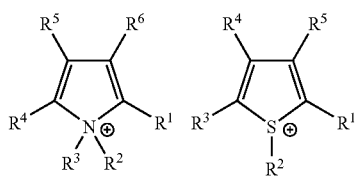

(5)

and (3) Nine saturated ring onium cations represented by the general formula (6):

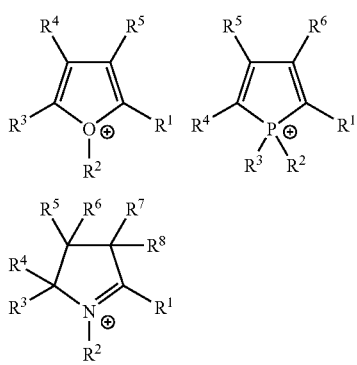

(6)

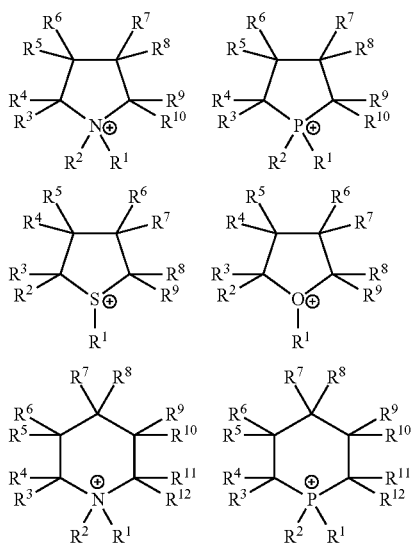

-continued

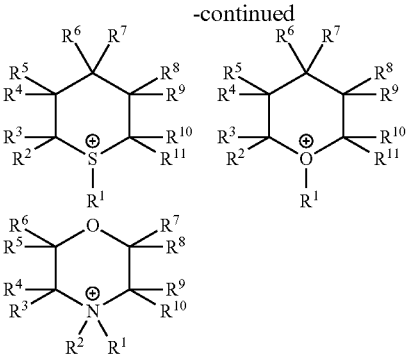

In the above-mentioned general formulas; $R^1$ to $R^{12}$ are the same or different and each is an organic group and two of them may be bonded together.

(4) Linear onium cations in which R is a $C_1$-$C_8$ alkyl group.

More preferred among such onium cations are those in which L in the general formula (2) is a nitrogen atom. Still more preferred are four onium cations represented by the following general formula (7):

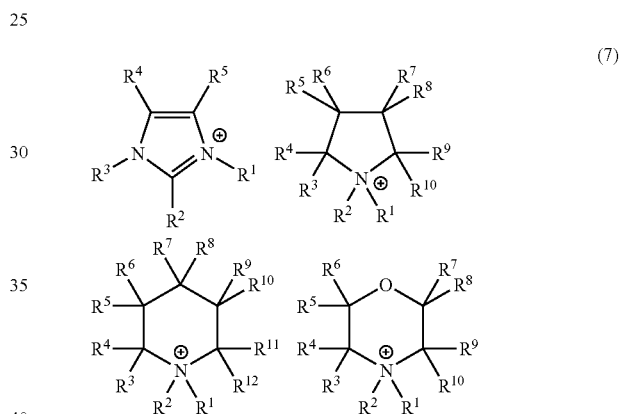

(7)

wherein $R^1$ to $R^{12}$ are as defined above.

The organic group represented by each of $R^1$ to $R^{12}$ mentioned above is preferably a hydrogen atom, a fluorine atom, an amino, imino, amide, ether, ester, hydroxyl, carboxyl, carbamoyl, cyano, sulfone or sulfide group or a straight, branched or cyclic $C_1$-$C_{18}$ hydrocarbon group or fluorocarbon group, which may comprising a nitrogen, oxygen, sulfur or like atom or atoms. More preferred are a hydrogen atom, a fluorine atom, a cyano group, a sulfone group, and $C_1$-$C_8$ hydrocarbon group.

The proportion of the onium cation in the material for electrolytic solutions according to the present invention is preferably not less than 0.5 mole but not more than 2.0 moles, more preferably not less than 0.8 mole but not more than 1.2 moles, per mole of the anion of the general formula (1).

Preferably, the material for electrolytic solution according to the present invention comprises an alkali metal salt and/or an alkaline earth metal salt. In this case, the alkali metal salt and/or alkaline earth metal salt may be a compound comprising the anion of general formula (1) as an essential constituent thereof or another compound separately added or may comprise both. The material for electrolytic solutions according to the present invention which comprises such alkali metal salt and/or alkaline earth metal salt and thus comprises an electrolyte can serve as an adequate material for electrolytic solution in electrochemical devices. Suited as the alkali metal salt are the lithium salt, sodium salt and potassium salt. Suitable as the alkaline earth metal salt are the calcium salt and magnesium salt. The lithium salt is more preferred.

Referring to the compound having the anion of the general formula (1) as an essential constituent thereof in accordance with the present invention, the lithium salt of the dicyanamide anion is preferred as far as the lithium salt is concerned. Other preferred species are such inorganic salts as $LiSi(CN)_3$, $LiB(CN)_4$, $LiAl(CN)_4$, $LiP(CN)_6$ and $LiAs(CN)_6$.

The compound to be added separately from the compound having the anion of the general formula (1) as an essential constituent thereof in accordance with the present invention is preferably an electrolyte salt showing a high dissociation constant in the electrolytic solution. Thus, suited for use are alkali metal salts and alkaline earth metal salts of trifluoromethanesulfonic acid, such as $LiCF_3SO_3$, $NaCF_3SO_3$ and $KCF_3SO_3$; alkali metal salts and alkaline earth metal salts of perfluoroalkanesulfonimides, such as $LiN(CF_3SO_2)_2$ and $LiN(CF_3CF_3SO_2)_2$; alkali metal salts and alkaline earth metal salts of hexafluorophosphoric acid, such as $LiPF_6$, $NaPF_6$ and $KPF_6$; alkali metal salts and alkaline earth metal salts of perchloric acid, such as $LiClO_4$ and $NaClO_4$; tetrafluoroborate salts such as $LiBF_4$ and $NaBF_4$; and such alkali metal salts as $LiAsF_6$, $LiI$, $NaI$, $NaAsF_6$ and $KI$. Among these, $LiPF_6$, $LiBF_4$, $LiAsF_6$, and alkali metal salts and alkaline earth metal salts of perfluoroalkanesulfonimides are preferred from the solubility and ionic conductivity viewpoint.

The material for electrolytic solutions according to the invention may contain a further electrolyte salt. Preferred as such are perchloric acid quaternary ammonium salts such as tetraethylammonium perchlorate; tetrafluoroboric acid quaternary ammonium salts such as $(C_2H_5)_4NBF_4$; such quaternary ammonium salts as $(C_2H_5)_4NPF_6$; quaternary phosphonium salts such as $(CH_3)_4P.BF_4$ and $(C_2H_5)_4P.BF_4$. Preferred from the solubility and ionic conductivity viewpoint are quaternary ammonium salts.

The proportion of such electrolyte salt in the material for electrolytic solutions according to the present invention is preferably such that the electrolyte salt accounts for not less than 0.1% by mass but not more than 50% by mass, more preferably not more than 30% by mass, relative to 100% by mass of the material for electrolytic solutions. When it is less than 0.1% by mass, the absolute ion amount will be insufficient, possibly leading to a low ionic conductivity. When it exceeds 50% by mass, the migration of ions may be inhibited to a great extent.

When it contains the proton, the material for electrolyte solutions according to the present invention can suitably serve as a material of a hydrogen cell-constituting ionic conductor. Such material for electrolyte solutions that further comprises the proton constitutes one of the preferred modes of embodiment of the present invention. In the practice of the present invention, the proton can occur in the electrolytic solution when the material for the electrolytic solution contains a compound capable of proton generation upon dissociation.

The proportion of the proton in the material for electrolyte solutions according to the present invention is preferably not less than 0.01 mole/L but not more than 10 moles/L, more preferably not more than 5 moles/L, relative to the material for electrolyte solutions. When it is less than 0.01 mole/L, the absolute proton amount will be insufficient, possibly leading to a low protonic conductivity. When it exceeds 10 moles/L, the migration of ions may be inhibited to a great extent.

Preferably, the material for electrolyte solutions according to the present invention further comprises an organic compound. The organic compound, which may comprise one single species or two or more species, is preferably an organic solvent. When the material comprises an organic solvent, the ionic conductivity thereof is further improved, rendering the material suited for use as an electrolytic solution.

The above-mentioned organic solvent is preferably one showing good compatibility with other constituent elements of the material for electrolytic solutions according to the present invention, having a high permittivity, highly capable of dissolving the electrolyte salt, having a boiling point of not lower than 60° C. and showing electrochemical stability in a wide range. More preferably it is an organic solvent low in water content (nonaqueous solvent).

Suited for use as such organic solvent are ethers such as 1,2-dimethoxyethane, tetrahydrofuran, 2-methyltetrahydrofuran, crown ethers, triethylene glycol methyl ether, tetraethylene glycol dimethyl ether and dioxane; carbonic acid esters or carbonates such as ethylene carbonate, propylene carbonate, dimethyl carbonate, diethyl carbonate, methyl ethyl carbonate and vinylene carbonate; aliphatic esters such as methyl propionate and methyl formate; aliphatic nitriles such as acetonitrile and propionitrile; aromatic nitriles such as benzonitrile and tolunitrile; amides such as dimethylformamide; sulfoxides such as dimethyl sulfoxide; lactones such as γ-butyrolactone; sulfur compounds such as sulfolane; nitromethane, N-methylpyrrolidone, N-vinylpyrrolidone, and phosphate esters. Among them, carbonate esters, aliphatic esters and ethers are preferred, and carbonates are most preferred.

When an electrolytic solution is prepared using the material for electrolytic solutions according to the present invention, the proportion of the organic solvent is preferably not less than 1% by mass but not more than 1,000% by mass, more preferably not less than 5% by mass but not more than 500% by mass, relative to 1% by mass of the material for electrolytic solutions. When it is less than 1% by mass, the viscosity and other problems may make it difficult to use the solution. When it exceeds 1,000% by mass, the ionic conductivity may decrease.

A molten salt may be used as the above-mentioned organic compound. The term "molten salt" as used herein means a salt showing a liquid state in the temperature range of from room temperature to 80° C. Suited for use as the cation of such molten salt are the onium cations represented by the general formulas (2) to (7) given hereinabove.

Suitable as the anion of the molten salt to be used in the practice of the present invention are halogen anions (fluoroanion, chloroanion, bromoanion, iodoanion), tetrafluoroborate anion, hexafluorophosphate anion, hexafluoroarsenate anion, cyano group-containing anions represented by the general formula (1) given hereinabove, sulfonylimide anions represented by the general formula (8) given hereinbelow, sulfonylmethide anions represented by the general formula (9) given hereinbelow, and organic carboxylic acid anions (e.g. acetate, trifluoroacetate, phthalate, maleate and benzoate anions).

$$^{\ominus}N(SO_2R^{13})(SO_2R^{14}) \qquad (8)$$

In the above general formula (8), $R^{13}$ and $R^{14}$ are the same or different and each represents a $C_{1-4}$ perfluoroalkyl group, which may contain one or two ether groups.

$$^{\ominus}C(SO_2R^{13})(SO_2R^{14})(SO_2R^{15}) \qquad (9)$$

In the above general formula (9), $R^{13}$, $R^{14}$ and $R^{15}$ are the same or different and each represents a $C_{1-4}$ perfluoroalkyl group, which may contain one or two ether groups. Among such anions, those cyano group-containing anions represented by the general formula (1) are suited for use, and anions represented by the general formula (10) given below are preferred forms of such cyano group-containing anions.

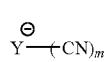
(10)

In the above general formula (10), Y is the same as X appearing in the general formula (1) and m is a positive integer. Preferred examples of Y is nitrogen, among others. The value of m is determined by the valence of the element Y.

The proportion of the molten salt in the material for electrolyte solutions according to the present invention is preferably not less than 1% by mass but not more than 1,000% by mass, more preferably not less than 5% by mass but not more than 500% by mass, relative to 1% by mass of the material for electrolyte solutions.

The material for electrolytic solutions according to the present invention may further comprise one or more constituents other than those mentioned hereinabove unless the effects of the present invention are sacrificed. For example, it may comprise one or more of various inorganic oxides in minute particle form.

Suitable as the above-mentioned inorganic oxide in minute particle form are those which show no electronic conductivity and are electrochemically stable. Those which show ionic conductivity are more preferred. Suitable as such minute particle-form oxides are α, β and γ-alumina, silica, titania, zirconia, magnesia, barium titanate, titanium oxide, hydrotalcite, and like ionically conductive or nonconductive ceramics in minute particle form.

The above-mentioned inorganic oxide in fine powder form preferably has a specific surface area as large as possible, preferably not less than 5 m$^2$/g, more preferably not less than 50 m$^2$/g, as determined by the BET method. Such inorganic oxide in minute particle form may have any crystal particle diameter provided that it can be mixed up with the other constituent elements of the electrolytic solution. A preferred size (mean crystal particle diameter) is not less than 0.01 μm but not more than 20 μm, more preferably not less than 0.01 μm but not more than 2 μm.

The above-mentioned fine inorganic oxide particles may be variegated in shape or form, for example spherical, oval, cubic, cuboid, cylindrical, or rod-like.

The level of addition of the above-mentioned inorganic oxide in minute particle form is preferably not more than 100% by mass, more preferably not less than 0.1% by mass but not more than 20% by mass, relative to the material for electrolytic solutions. When it exceeds 100% by mass, the oxide may adversely lower the ionic conductivity.

The material for electrolytic solutions according to the present invention preferably has an ionic conductivity of not less than 0.5 mS/cm, more preferably not less than 2.0 mS/cm, as determined at 0° C. When the ionic conductivity at 0° C. is less than 0.5 mS/cm, there arises the possibility of the electrolytic solution prepared by using the material for electrolytic solutions according to the present invention failing to stably function while retaining a sufficient level of ionic conductivity with the lapse of time.

The above-mentioned ionic conductivity can judiciously be measured by the complex impedance method using an impedance analyzer called HP4294A (trademark, product of Toyo Corporation) in which SUS electrodes are used.

The present invention also relates to a material for electrolytic solutions which comprises an ionic liquid and an alkali metal salt and/or an alkaline earth metal salt and in which the mixture of the ionic liquid and the alkali metal salt and/or alkaline earth metal salt in the above-mentioned material for electrolytic solutions shows a viscosity of not higher than 300 mPa·s at a room temperature (25° C.). Usable as the ionic liquid and alkali metal salt and/or alkaline earth metal salt, which constitute such material for electrolytic solutions are those respective constituents of the material for electrolytic solutions as mentioned hereinabove.

When the above-mentioned mixture has a viscosity exceeding 300 mPa·s, the ionic conductivity may not be improved to a satisfactory extent. Preferably, the mixture has a viscosity of not more than 200 mPa·s, more preferably not more than 100 mPa·s.

The method of measurement of the above-mentioned viscosity is not particularly restricted but the method which comprises using a model TV-20 cone/plate type viscometer (product of Tokimec Inc.) and performing the measurement at 25° C. can judiciously be used.

The present inventors further found that while an electrolyte salt is generally constituted of a lithium salt or the like, a mixture which comprises, together with such salt, a cyano group-containing ionic substance in a specific mass ratio between these compounds as essential constituents hardly undergoes decomposition at high voltage levels and, therefore, can be applied in large capacity cells or batteries, for instance, namely that an ionic conductor material electrochemically stable at high voltage levels and suited for use as an ionic conductor in constituting an electrochemical device such as a large capacity cell or battery can thus be provided. The reason why the cyano group-containing ionic substance makes the system electrochemically stable is supposedly that a film is formed on the electrodes where oxidation and reduction reactions take place, whereby the interface between the electrodes and the ionic conductor substance is electrochemically stabilized. Such ionic conductor material comprises (A) an alkali metal salt and/or an alkaline earth metal salt and (B) a cyano group-comprising ionic substance as essential constituents and, when the mass of the alkali metal salt and/or alkaline earth metal salt (A), one of the essential constituents of the ionic conductor material, is expressed as A and the mass of the cyano group-comprising ionic substance (B), another essential constituent, is expressed as B, the mass ratio (A/B) is 0.001/99.999 to 99.999/0.001. Such ionic conductor material constitutes a further aspect of the present invention.

In preferred embodiments of the above-mentioned ionic conductor material, the mass ratio (A/B) is not less than 1/200 but not more than 200/1, more preferably not less than 1/100 but not more than 100/1, still more preferably not less than 1/50 but not more than 50/1. Preferred from the viewpoint of improving the electrochemical stability of the alkali metal salt and/or alkaline earth metal salt (A) in electrochemical devices and the like are cases where the cyano group-comprising ionic substance (B) is contained in small amounts as compared with the alkali metal salt and/or alkaline earth metal salt, for example in a mass ratio (A/B) of not more than 50/1.

The alkali metal salt and/or alkaline earth metal salt (A) in the above-mentioned ionic conductor material may be any of those compounds which take the form of salts with an alkali metal and/or an alkaline earth metal and can serve as ionic conductors. For example, the alkali metal salts and alkaline earth metal salts derived from the following ions or acids. These may be used singly or two or more of them may be used combinedly.

(1) Fluorine atom-comprising anions such as perfluoroalkylsulfonyl ions, bis(perfluoroalkylsulfonyl)imide ions, (arylsulfonyl)perfluoroalkylsulfonylimide ions, (alkylsulfonyl)p- erfluoroalkylsulfonylimide ions and tri(perfluoroalkylsulfonyl)methide ions;
(2) Fluorine atom-comprising acids such as hexafluorophosphoric acid, tetrafluoroboric acid, hexafluoroarsenic acid and hexafluoroantimonic acid;
(3) Inorganic acids such as perchloric acid and nitric acid;
(4) Halogen ions such as fluoride ion, chloride ion, bromide ion and iodide ion.

Preferred as specific species of the above mentioned alkali metal salt and/or alkaline earth metal salt (A) are $LiCF_3SO_3$, $LiC_4F_9SO_3$, $LiC_8F_{17}SO_3$, $NaCF_3SO_3$, $KCF_3SO_3$, $Li[(CF_3)_2NC_2F_4SO_3]$, $LiN(CF_3SO_2)_2$, $LiN(CF_3CF_2SO_2)_2$, $NaN(CF_3SO_2)_2$, $LiN[(CF_3)_2NC_2F_4SO_2]_2$, $LiN(C_6F_5SO_2)(CF_3SO_2)$, $LiC(CF_3SO_2)_3$, $LiPF_6$, $NaPF_6$, $KPF_6$, $LiBF_4$, $NaBF_4$, $LiAsF_6$, $NaAsF_6$, $LiClO_4$, $NaClO_4$, $LiI$, $NaI$, $KI$, $LiNO_3$ and the like. Among these, lithium salts are preferred.

The above-mentioned ionic conductor material comprises, as essential constituents, at least two substances, namely the alkali metal salt and/or alkaline earth metal salt (A) and the cyano group-comprising ionic substance (B). Therefore, when the alkali metal salt and/or alkaline earth metal salt (A) and the cyano group-comprising ionic substance (B) are used, the cyano group-comprising ionic substance (B) is selected in a manner such that the alkali metal salt and/or alkaline earth metal salt (A) is a substance different from the cyano group-comprising ionic substance (B), namely that two substances serve as essential constituents.

Suitable as the cyano group-comprising ionic substance (B) in the above-mentioned ionic conductor material are cyanide anion-comprising ionic substances, and cyano group-substituted anion-containing ionic substances, among others. These are compounds in the form comprising the cyano group serving as an anion, or in the form comprising a cyano group-comprising group serving as an anion. These may be used singly or two or more of them may be used combinedly. Among them, ionic substances having a cyano group-substituted anion are preferred.

Suitable as the cyanide anion-comprising ionic substances are, for example, alkali metal cation-comprising ionic substances such as sodium cyanide, potassium cyanide and lithium cyanide; alkaline earth metal cation-comprising ionic substances such as calcium cyanide and magnesium cyanide; copper group cation-comprising ionic substances such as copper cyanide, silver cyanide and gold cyanide; and organic cation-comprising ionic substances such as ammonium cyanide.

Preferred as the above-mentioned cyano group-substituted anion-comprising ionic substances are, for example, ionic substances having an anion represented by the following general formula (11):

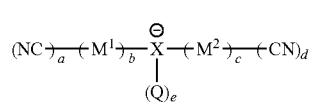

(11)

wherein X represents at least one element selected from among B, C, N, O, Al, Si, P, S, As and Se; $M^1$ and $M^2$ are the same or different and each represents an organic linking group; Q represents an organic group; a is an integer of not less than 1, and b, c, d and e each independently is an integer of not less than 0.

Referring to the above-mentioned general formula (11), X represents at least one element selected from among B, C, N, O, Al, Si, P, S, As and Se and, among them, N is preferred. Q represents an organic group, preferably a hydrogen atom, a halogen atom, $C_pF_{(2p+1-q)}H_q$, $OC_pF_{(2p+1-q)}H_q$, $SO_2C_pF_{(2p+1-q)}H_q$, $CO_2C_pF_{(2p+1-q)}H_q$, $SO_3C_6F_{5-r}H_r$, $NO_2$ or the like (in each formula, $1 \leq p \leq 6$, $0 < q \leq 13$, $0 < r \leq 5$). More preferred are a fluorine atom, a chlorine atom, $C_pF_{(2p+1-q)}H_q$ and $SO_2C_pF_{(2p+1-q)}H_q$.

In the above-mentioned general formula (11), $M^1$ and $M^2$ are the same as those $M^1$ and $M^2$ mentioned hereinabove referring to the general formula (1).

Preferred as the anion represented by the above-mentioned general formula (11) are anions represented by the general formula (11) in which e is 0. More preferred is the dicyanamide anion. Anions represented by the following general formulas (12) or (13) and the like are also preferred.

(12)

(13)

As those constituents other than the above-mentioned alkali metal salt and/or alkaline earth metal salt (A) and cyano group-comprising ionic substance (B) which are preferred or may be comprised in the above-mentioned ionic conductor material, there may be mentioned the same ones as the corresponding constituents of the above-mentioned material for electrolytic solutions.

The above-mentioned material for electrolytic solutions or the above-mentioned ionic conductor material is judiciously used as an ionic conductor material in constituting cells or batteries having charge/discharge mechanisms, such as primary cells, lithium (ion) secondary batteries and fuel cells, electrolytic capacitors, electric double layer capacitors, solar cells, electrochromic display devices and other electrochemical devices. A lithium secondary battery, electrolytic capacitor or electric double layer capacitor in which such material for electrolytic solutions or such ionic conductor material is used also constitutes a further aspect of the present invention.

In cases where an electrochemical device is constituted using the above-mentioned material for electrolytic solutions or ionic conductor material, a preferred form of the electrochemical device comprises, as basic constituent elements, an ionic conductor, a negative electrode, a positive electrode, current collectors, separators and a container.

Preferred as the above-mentioned ionic conductor is a mixture of an electrolyte and an organic solvent. When an organic solvent is used, this ionic conductor becomes that which is generally called "electrolytic solution". The material for electrolytic solutions or the ionic conductor material according to the present invention can judiciously be used as a substitute for the electrolyte or organic solvent in the electrolytic solution in such ionic conductor. In an electrochemical device in which the material for electrolytic solutions or ionic conductor material according to the present invention is used as an ionic conductor material, at least one of these is constituted of the material for electrolytic solutions or ionic conductor material according to, the present invention.

The above-mentioned organic solvent may be any of those aprotic solvents capable of dissolving the material for electrolytic solutions or ionic conductor material according to the present invention, and the same organic solvents as mentioned hereinabove are preferred. However, when two or more solvents are used as a mixed solvent or the electrolyte comprises the Li ion, the electrolyte solution is preferably prepared by dissolving that material in a mixed solvent composed of an aprotic solvent having a permittivity of not less than 20 and an aprotic solvent having a permittivity of not more than 10 as selected from among such organic solvents. In particular when a lithium salt is used, its solubility in an aprotic solvent having a permittivity of not more than 10, such as diethyl ether or dimethyl carbonate, is low and no sufficient ionic conductivity is obtained. Conversely, its solubility in an aprotic solvent having a permittivity of not less than 20 is high but the solution shows a high viscosity, hence the migration of ions becomes difficult and, also in this case, no sufficient ionic conductivity is obtained. When these are mixed together, appropriate levels of solubility and mobility can be secured and a sufficient level of ionic conductivity can be obtained.

In cases where the material for electrolytic solutions or ionic conductor material according to the present invention comprises an organic solvent, the solvent-comprising form is preferably produced by preparing an electrolyte solution comprising an alkali metal salt and/or alkaline earth metal salt and the organic solvent and adding thereto and dissolving therein the compound comprising the above-mentioned anion of the above-mentioned general formula (1) as an essential constituent. Such production method constitutes one of the preferred embodiments of the present invention.

The electrolyte concentration in the above-mentioned material for electrolytic solutions or ionic conductor is preferably not less than $0.01$ mole/$dm^3$ but not more than the saturation concentration, more preferably not less than $0.1$ mole/$dm^3$ but not more than $2.0$ moles/$dm^3$. Concentration less than $0.01$ mole/$dm^3$ is undesirable, since the ionic conductivity, is low at such concentration.

In the case of lithium batteries, metallic lithium or an alloy of lithium and another metal is suitable as the material of the above-mentioned negative electrode. In the case of lithium ion batteries, polymers, organic materials, carbon obtained by baking pitch or the like, natural graphite, metal oxides, and like materials in which the phenomenon called intercalation is utilized are appropriate. In the case of electric double layer capacitors, activated carbon, porous metal oxides, porous metals and conductive polymers are judiciously used.

Suitable as the above-mentioned positive electrode material in the case of lithium batteries and lithium ion batteries are lithium-comprising oxides such as $LiCoO_2$, $LiNiO_2$, $LiMnO_2$ and $LiMn_2O_4$; such oxides as $TiO_2$, $V_2O_5$ and $MoO_3$; such sulfides as $TiS_2$ and $FeS$; and conductive polymers such as polyacetylene, polyparaphenylene, polyaniline and polypyrrole. In the case of electric double layer capacitors, activated carbon, porous metal oxides, porous metals and conductive polymers are preferred.

In the following, (1) a lithium secondary battery, (2) an electrolytic capacitor and (3) an electric double layer capacitor, in which the material for electrolytic solutions or ionic conductor material according to the present invention is used, are described in detail.

(1) Lithium Secondary Battery

A lithium secondary battery is constituted of the following basic constituent elements: a positive electrode, a negative electrode, separators occurring between the positive and negative electrodes, and an ionic conductor in which the material for electrolytic solutions or ionic conductor material according to the present invention is used. In this case, a lithium salt is contained as an electrolyte in the material for electrolytic solutions or ionic conductor material according to the present invention. Preferred as such a lithium secondary battery is a nonaqueous electrolyte lithium secondary battery, which is other than an aqueous electrolyte lithium secondary battery. A form of such lithium secondary battery is schematically shown, in cross section, in FIG. 1. In this lithium secondary battery, coke is used as the negative electrode active substance to be mentioned later herein, and a Co-comprising compound as the positive electrode active substance. During charge of such lithium secondary battery, the reaction $C_6Li \rightarrow 6C+Li+e$ occurs on the negative electrode, the electron (e) generated on the negative electrode surface migrates through the electrolytic solution to the positive electrode surface in the manner of ionic conduction. On the positive electrode surface, the reaction $CoO_2+Li+e \rightarrow LiCoO_2$ occurs. An electric current thus flows from the negative electrode to the positive electrode. During discharge, the reverse reactions occur, and an electric current runs from the positive electrode to the negative electrode. In this manner, electricity can be stored or supplied by such ion-involving chemical reactions.

The above-mentioned negative electrode is preferably produced by applying a negative electrode mixture comprising a negative electrode active substance, a negative electrode conductor material and a negative electrode binder, among others, to the surface of a negative electrode current collector. The negative electrode mixture may comprise one or more of various additives in addition to the conductor and binder.

Suitable as the above-mentioned negative electrode active substance are metallic lithium and other materials capable of occluding and releasing lithium ions. Suited for use as the materials capable of occluding and releasing the above-mentioned lithium ions are metallic lithium; pyrolytic carbon; coke species such as pitch coke, needle coke and petroleum coke; graphite; glassy carbon; organic polymer-derived baking products which are produced by baking phenolic resins, furan resins and the like at an appropriate temperature to converting them into carbon; carbon fibers; carbon materials such as activated carbon; polymers such as polyacetylene, polypyrrole and polyacene; lithium-comprising transition metal oxides or transition metal sulfides, e.g. $Li_{4/3}Ti_{5/3}O_4$ and $TiS_2$; metals capable of alloying with alkali metals, e.g. Al, Pb, Sn, Bi and Si; cubic intermetallic compounds capable of intercalating alkali metals, e.g. AlSb, $Mg_2Si$ and $NiSi_2$, and lithium nitrogen compounds such as $Li_{3-x}G_xN$ (G: transition metal). These may be used singly or two or more of them may be used combinedly. Among these, metallic lithium and carbonaceous materials, which can occlude and release alkali metal ions, are more preferred.

The above-mentioned negative electrode conductor material may be any electron conductive material. Preferred are graphite species, e.g. natural graphite such as flaky graphite, and artificial graphite; carbon black species such as acetylene black, Ketjen black, channel black, furnace black, lamp black and thermal black; conductive fibers such as carbon fibers and metal fibers; carbon fluoride; powder-form metals such as copper and nickel; and organic conductive materials such as polyphenylene derivatives, among others. These may be used singly or two or more them may be used combinedly. Among these, artificial graphite; acetylene black and carbon fibers are more preferred. The negative electrode conductor is used preferably in an amount of 1 to 50 parts by weight, more preferably 1 to 30 parts by weight, per 100 parts by weight of the negative electrode active substance. Since the negative electrode active substance has electric conductivity, it is not always necessary to use a negative electrode conductor.

The above-mentioned negative electrode binder may be either a thermoplastic resin or a thermosetting resin. Preferred are polyethylene, polypropylene, polytetrafluoroethylene, polyvinylidene fluoride, styrene-butadiene rubbers, tetrafluoroethylene-hexafluoropropylene copolymers, tetrafluoroethylene-perfluoroalkyl vinyl ether copolymers, vinylidene fluoride-hexafluoropropylene copolymers, vinylidene fluoride-chlorotrifluoroethylene copolymers, ethylene-tetrafluoroethylene copolymers, polychlorotrifluoroethylene, vinylidene fluoride-pentafluoropropylene copolymers, propylene-tetrafluoroethylene copolymers, ethylene-chlorotrifluoroethylene copolymers, vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers, ethylene-methacrylic acid copolymers, ethylene-methyl acrylate copolymers, ethylene-methyl methacrylate copolymers, polyamides, polyurethanes, polyimides, polyvinylpyrrolidone and a copolymer thereof and the like. These may be used singly or two or more of them may be used combinedly. Among these, styrene-butadiene rubbers, polyvinylidene fluoride, ethylene-acrylic acid copolymers, ethylene-methacrylic acid copolymers, ethylene-methyl acrylate copolymers, ethylene-methyl methacrylate copolymers, polyamides, polyurethanes, polyimides, polyvinylpyrrolidone and a copolymer thereof are more preferred.

The above-mentioned negative electrode current collector mentioned above may be made of any electron conductor that will not cause any chemical change within the cell or battery. Preferred are, among others, stainless steel, nickel, copper, titanium, carbon, conductive resins, and copper or stainless steel with carbon, nickel, titanium or the like adhering to or covering the surface thereof. Among these, copper and copper-comprising alloys are more preferred. These may be used singly or two or more of them may be used combinedly. These negative electrode current collectors may be used after oxidation of the surface thereof. Furthermore, it is desirable that the collector surface be made uneven. The negative electrode current collector preferably has the form of a foil, film, sheet, net, punched body, lath, porous body, foamed body, or molded fiber group, for instance. Preferably the current collector has a thickness of 1 to 500 µm.

The above-mentioned positive electrode mentioned above is preferably produced by applying a positive electrode mixture comprising a positive electrode active substance, a positive electrode conductor material, a positive electrode binder and so forth to the surface of a positive electrode current collector. The positive electrode mixture may comprise one or more of various additives in addition to the conductor and binder.

Suited for use as the above-mentioned positive electrode active substance are, among others, metallic Li, $Li_xCoO_2$, $Li_xNiO_2$, $Li_xMnO_2$, $Li_xFePO_4$, $Li_xCo_yNi_{1-y}O_2$, $Li_xCo_yJ_{1-y}O_z$, $Li_xNi_{1-y}J_yO_z$, $Li_xMn_2O_4$, $Li_xMn_{2-y}J_yO_4$, $Li_xFe_{1-y}Mn_yPO_4$; and lithium-free oxides such as $MnO_2$, $V_gO_h$ and $Cr_gO_h$ (g and h each being an integer of not less than 1). These may be used singly or two or more of them may be used combinedly.

The above symbol J represents at least one element selected from among Na, Mg, Sc, Y, Mn, Fe, Co, Ni, Cu, Zn, Al, Cr, Pb, Sb and B. The number x is within the range $0 \leq x \leq 1.2$, y within the range $0 \leq y \leq 0.9$, and z within the range $2.0 \leq z \leq 2.3$, and the value of x varies as a result of cell or battery charge or discharge. Also employable as the positive electrode active substance are transition metal chalcogenides, vanadium oxides or niobium oxides, which may comprise lithium, conjugated polymer-based organic conductive substances, Chevrel phase compounds, and the like. The positive active substance particles preferably have an average particle diameter of 1 to 30 µm.

The above-mentioned positive electrode conductor material may be any of those electron-conductive materials which will not cause any chemical change at the charge/discharge voltage for the positive electrode active substance employed. Suitable are, among others, the same ones as mentioned hereinabove referring to the negative electrode conductor material; metals in powder form, such as aluminum and silver; conductive whiskers such as zinc oxide and potassium titanate; and conductive metal oxides such as titanium oxide. These may be used singly or two or more of them may be used combinedly. Among these, artificial graphite, acetylene black, Ketjen black, and nickel in powder form are more preferred. The positive electrode conductor material is preferably used in an amount of 1 to 50 parts by weight, more preferably 1 to 30 parts by weight, per 100 parts by weight of the positive electrode active substance. When carbon black or graphite is used, 2 to 15 parts by weight thereof is preferably used per 100 parts by weight of the positive electrode active substance.

The above-mentioned positive electrode binder may be either a thermoplastic resin or a thermosetting resin. Suitable are those mentioned hereinabove referring to the negative electrode binder other than styrene-butadiene rubbers and, further, tetrafluoroethylene-hexafluoroethylene copolymers. They may be used singly or two or more of them may be used combinedly. Among them, polyvinylidene fluoride and polytetrafluoroethylene are more preferred.

The positive electrode current collector mentioned above may be made of any electron conductor that will not cause any chemical change at the charge/discharge voltage levels for the positive electrode active substance employed. Suitable are, among others, stainless steel, aluminum, titanium, carbon, conductive resins, and aluminum or stainless steel with carbon, titanium or the like adhering to or covering the surface thereof. These may be used singly or two or more of them may be used combinedly. Among them, aluminum and aluminum-comprising alloys are preferred. These positive electrode current collectors may be used after oxidation of the surface thereof. Furthermore, it is desirable that the collector surface be made uneven. The positive electrode current collector may have the same form and thickness as mentioned above referring to the negative electrode current collector.

The above-mentioned separators each is preferably made of a microporous insulating thin membrane showing a high level of ion permeability and a required level of mechanical strength and preferably functioning to close its pores at temperatures exceeding a certain level and thereby increase the resistance. Suited for use as the material thereof from the organic solvent resistance and hydrophobicity viewpoint are, among others, porous synthetic resin films made of a polyolefin such as polyethylene or polypropylene, woven or nonwoven fabrics made of an organic material such as polypropylene or a fluorinated polyolefin, and woven or nonwoven fabrics made of glass fibers or an inorganic material. The separators preferably have a pore diameter within a range such that they are impermeable to the positive electrode active substance, negative electrode active substance, binders and conductor materials dropped away from the electrodes. The pore diameter is thus preferably 0.01 to 1 µm. The separator thickness is preferably 5 to 300 µm, more preferably 10 to 50 µm. The void content is preferably 30 to 80%.

The separator surface is preferably modified in advance by corona discharge treatment, plasma discharge treatment, or wet treatment using a surfactant so that the hydrophobicity thereof may be reduced. Such treatment can improve the wettability of the separator surface and pore inside, making it possible to prevent, to the utmost, the internal resistance of the cell or battery from increasing.

In the constitution of the above-mentioned lithium secondary battery, an electrolytic solution-carrying polymer material gel may be comprised in the positive electrode mixture or negative electrode mixture, or a porous separator made of an electrolytic solution-carrying polymer material may be integrated with the positive electrode or negative electrode. The above-mentioned polymer material may be any one capable of holding the electrolytic solution and preferably is a vinylidene fluoride-hexafluoropropylene copolymer, for instance.

As for the form of the above-mentioned lithium secondary battery, there may be mentioned the coin form, button form, sheet form, layer-built form, cylindrical form, flat form, rectangular form, large form for use in an electric vehicle, and so forth.

(2) Electrolytic Capacitor

An electrolytic capacitor is constituted of the following fundamental constituent elements: an anode foil, a cathode foil, an electrolytic paper sheet sandwiched between the anode foil and cathode foil and serving as a separator, lead wires and an ionic conductor prepared by using the material for electrolytic solutions or ionic conductor material according to the present invention. A schematic perspective view of one form of such electrolytic capacitor is shown in FIG. 2 (a). Preferred as such electrolytic capacitor is an aluminum electrolytic capacitor. One form of such aluminum electrolytic capacitor is schematically shown, in cross section, in FIG. 2 (b). In a preferred form of such aluminum electrolytic capacitor, a thin oxide (aluminum oxide) film or layer to serve as a dielectric is formed, by electrolytic anodic oxidation, on the aluminum foil surface roughened by rendering the same uneven by electrolytic etching.

(3) Electric Double Layer Capacitor

An electric double layer capacitor is constituted of the following fundamental constituent elements: a negative electrode, a positive electrode, and an ionic conductor prepared by using the material for electrolytic solutions or ionic conductor material according to the present invention. In a preferred form, the electrolytic solution, which is an ionic conductor, is comprised in an electrode element composed of the positive electrode and negative electrode opposed to each other. A schematic sectional view of one form of such electric double layer capacitor and a schematic enlargement of the electrode surface are shown in FIG. 3.

The above-mentioned positive electrode and negative electrode each is a polarizable electrode constituted of active, or activated, carbon to serve as an electrode active substance, such as active carbon fibers, a molding of active carbon particles, or active carbon particles, a conductor material and a binder substance, and is preferably used in such a molded form as a thin coat film, a sheet or a plate. In the electric double layer capacitor having such constitution, electric energy, or charge, is stored in the electric double layer formed at the interface between each polarizable electrode and the electrolytic solution as a result of physical adsorption and desorption of ions, as shown in the enlargement given in FIG. 3.

The above-mentioned active carbon preferably has an average pore diameter of not more than 2.5 nm. The average pore diameter of active carbon is preferably measured by the BET method based on the adsorption of nitrogen. As for the specific surface area of active carbon, it may vary depending, among others, on the electrostatic capacity of the carbonaceous species per unit area $(F/m^2)$ and on the decrease in bulk density due to the increase in specific surface area but, when the specific surface area is determined by the BET method based on the adsorption of nitrogen, it is preferably 500 to 2,500 $m^2/g$, more preferably 1,000 to 2,000 $m^2/g$.

The above-mentioned active carbon is preferably produced by the activation method which comprises carbonizing a plant material, such as wood, sawdust, coconut shells or pulping waste liquor, a fossil fuel material, such as coal, heavy petroleum oil, or a pyrolyzate derived therefrom, e.g. coal pitch, petroleum pitch, petroleum coke, carbon aerogel, mesophase carbon or tar pitch fiber, a synthetic polymer material, such as a phenol resin, furan resin, polyvinyl chloride resin, polyvinylidene chloride resin, polyimide resin, polyimide resin, ion exchange resin, liquid crystal polymer, plastic waste or waste tires, or the like, followed by activation.

The above-mentioned activation method includes (1) the gas activation method which comprises bringing a carbonized material into contact and reaction with steam, carbon dioxide, oxygen or another oxidizing gas at elevated temperatures and (2) the chemical activation method which comprises uniformly impregnating a carbonized material with zinc chloride, phosphoric acid, sodium phosphate, calcium chloride, potassium sulfide, potassium hydroxide, sodium hydroxide, potassium carbonate, sodium carbonate, sodium sulfate, potassium sulfate, calcium carbonate, boric acid, nitric acid or the like and heating the mixture in an inert gas atmosphere to give active carbon as a result of the dehydration and oxidation reactions in the presence of the chemical. Either of the methods may be used.

The active carbon obtained by the above-mentioned activation method is preferably heat-treated in an inert gas atmosphere, such as nitrogen, argon, helium or xenon, at 500-2,500° C., more preferably 700-1,500° C., to thereby eliminate unnecessary surface functional groups and/or develop the crystallinity of carbon for increasing the electronic conductivity. The active carbon may be in a crushed, granulated, granular, fibrous, felt-like, woven or sheet form, for instance. When it occurs as granules, it preferably has an average grain diameter of not more than 30 μm from the viewpoint of electrode bulk density improvement and internal resistance reduction.

In addition to active carbon species, carbonaceous materials having such a high specific surface area as mentioned above may be used as the electrode active substance. For example, carbon nanotubes or diamond produced by plasma CVD may also be used.

Preferred as the above-mentioned conductor material are, among others, carbon black species, such as acetylene black and Ketjen black, natural graphite, thermally expansible graphite, carbon fibers, ruthenium oxide, titanium oxide, aluminum, nickel or like metal fibers. These may be used singly or two or more of them may be used combinedly. Among these, acetylene black and Ketjen black are more preferred since they can effectively improve the conductivity in small amounts. The level of addition of the conductor material may vary according to the bulk density of the active carbon but preferably is 5 to 50% by mass, more preferably 10 to 30% by mass, relative to 100% by mass of the active carbon.

Suited for use as the above-mentioned binder substance are polytetrafluoroethylene, polyvinylidene fluoride, carboxymethylcellulose, fluoroolefin copolymer crosslinked polymers, polyvinyl alcohol, polyacrylic acid, polyimides, polyamides, polyurethanes, polyvinylpyrrolidone and a copolymer thereof, petroleum pitch, coal pitch, and phenol resins, among others. These may be used singly or two or more of them may be used combinedly. The level of addition of the binder substance may vary according to the active carbon species and the form thereof, among others, but is preferably 0.5 to 30% by mass, more preferably 2 to 30% by mass, relative to 100% by mass of the active carbon.

Preferred as the method of forming the positive electrode and negative electrode mentioned above are, among others, (1) the method which comprises admixing polytetrafluoroethylene with a mixture of active carbon and acetylene black and subjecting the resulting mixture to press forming, (2) the method which comprises admixing active carbon with pitch, tar, phenolic resin or like binder substance, molding the mixture and subjecting the moldings to heat treatment in an inert atmosphere to give a sintered mass; and (3) the method which comprises sintering an active carbon-binder substance mixture or active carbon alone for electrode formation. When an active carbon fiber cloth obtained by activation treatment of a carbon fiber cloth is used, the cloth as it is may be used as the electrode without using any binder substance.

In the above-mentioned electric double layer capacitor, the polarizable electrodes are preferably prevented from contacting or short-circuiting with each other by inserting a separator between the polarizable electrodes or by opposing the polarizable electrodes with a space between them using a holding means, for instance. Suited for use as the separator are porous thin films which will not chemically react with the molten salt or any other constituent in the temperature range for use. Suitable separator materials are paper, polypropylene, polyethylene and glass fibers, among others.

The form of the electric double layer capacitor includes the coin type, wound type, rectangular type, aluminum laminate type and so forth. Any form may be employed.

The lithium secondary battery, electrolytic capacitor, electric double layer capacitor and other electrochemical devices in which the material for electrolytic solutions or ionic conductor material according to the present invention is used can judiciously be used in various fields of application, including portable information terminals, portable electronic apparatus or tools, small-sized household electric power storages, motorcycles, electric vehicles, hybrid electric vehicles and the like.

BEST MODES FOR CARRYING OUT THE INVENTION

Figure 1:
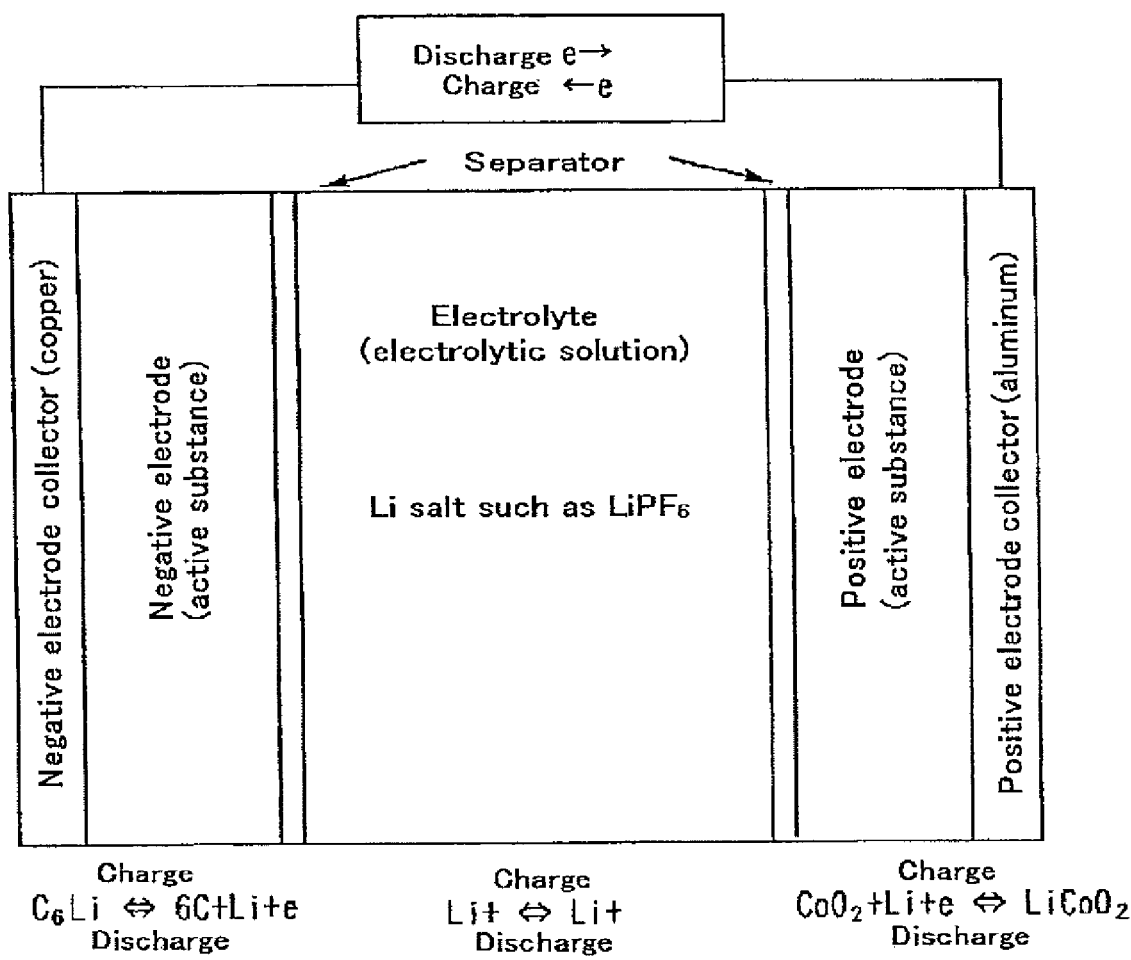
FIG. 1 is a schematic cross-sectional view of one form of the lithium secondary battery.
Figure 2:
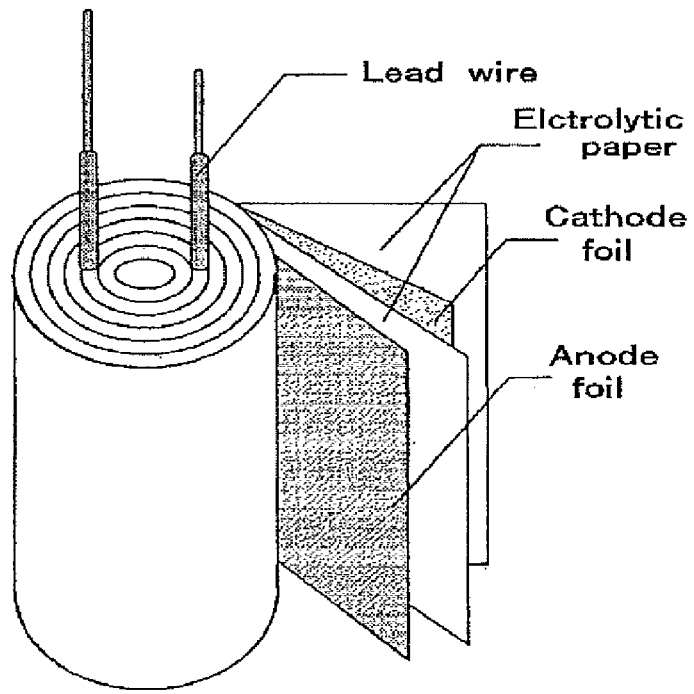
FIG. 2 (a) is a schematic perspective view of one form of the electrolytic capacitor, and FIG. 2 (b) is a schematic cross-sectional view of one form of the aluminum electrolytic capacitor.
Figure 2:
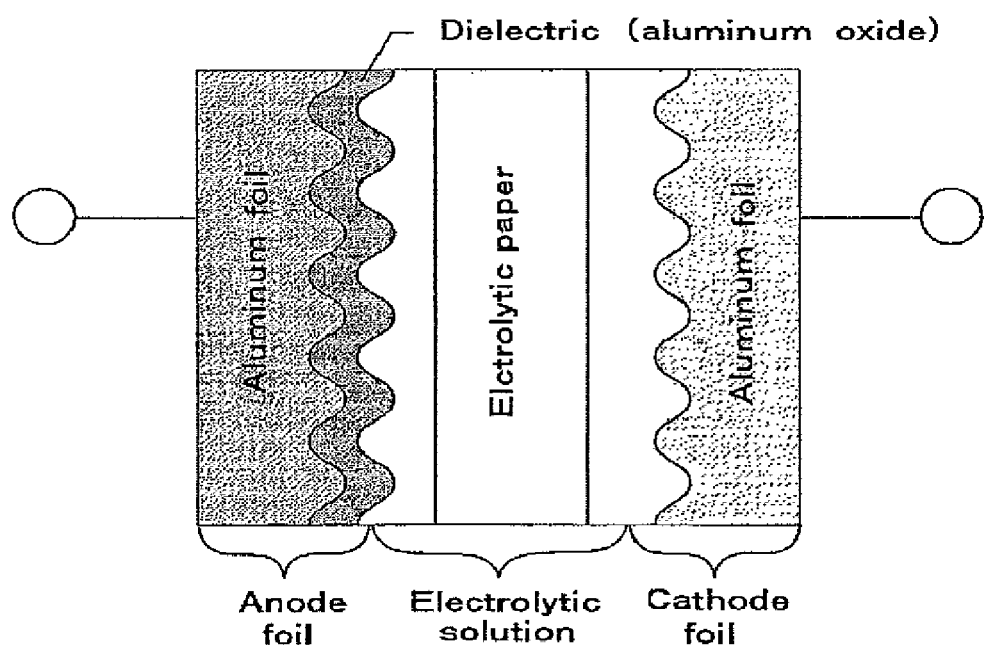
Figure 3:
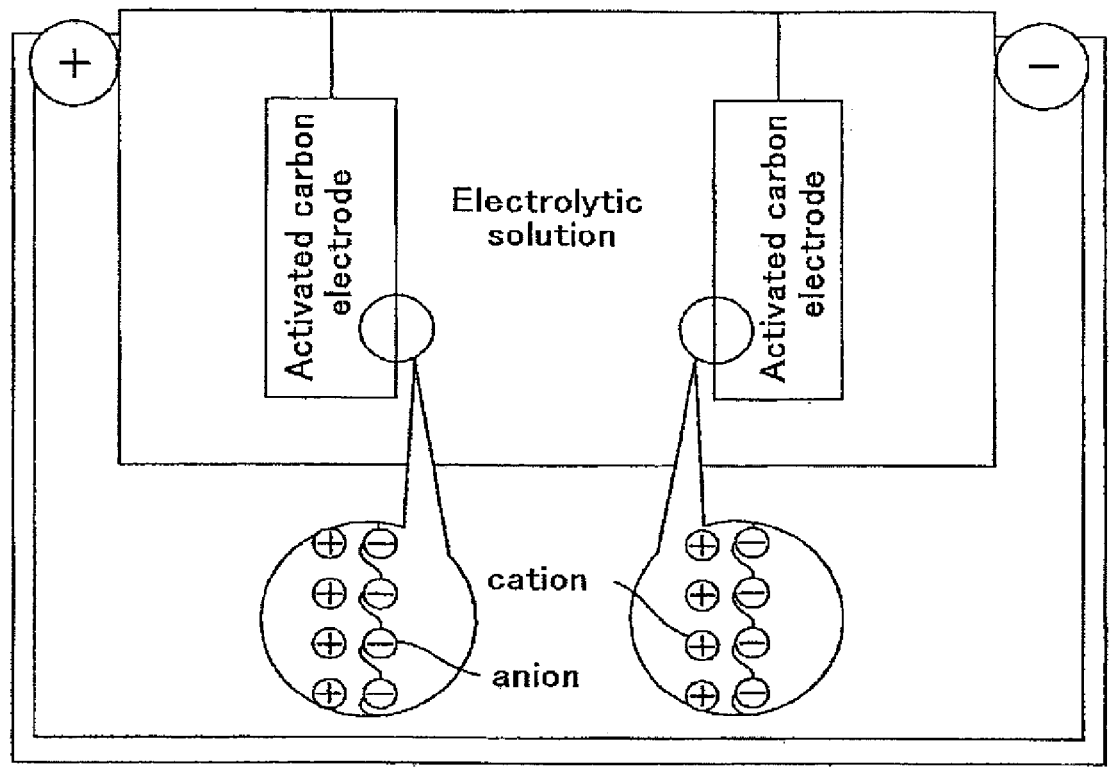
FIG. 3 is a schematic cross-sectional view of one form of the electric double layer capacitor, with an enlarged view of the electrode surface.

The following examples illustrate the present invention in more detail. These examples are, however, by no means limitative of the scope of the present invention. Unless otherwise specified, "part(s)" means "part(s) by weight", and "%" means "% by mass".

Example 1

Synthesis of N-methyl-N-butylpyrrolidinium dicyanamide

A flask equipped with a thermometer, nitrogen gas inlet tube, reflux condenser, stirrer and dropping funnel was charged with 11.7 g (67 mmol) of silver dicyanamide, 16.4 g (61 mmol) of N-methyl-N-butylpyrrolidinium iodide and 150 g of deionized water, and the mixture was stirred for 12 hours under a nitrogen stream while maintaining the temperature at 50° C. Then, the matter insoluble in deionized water was filtered off, and the volatile matter was removed using a rotary evaporator. The reaction product thus obtained was dissolved in dichloromethane, anhydrous magnesium sulfate was added, and the mixture was allowed to stand overnight for drying. The magnesium sulfate was then filtered off, the dichloromethane was removed using a rotary evaporator, and the residue was dried under reduced pressure at 100° C. for 6 hours to give N-methyl-N-butylpyrrolidinium dicyanamide (hereinafter abbreviated as MBPyDCA) (yield: 11.4 g, 90%).

Example 2

Synthesis of 1-methyl-2-ethyl-3-butylimidazolium dicyanamide

The procedure of Example 1 was followed in the same manner except that 14.9 g (61 mmol) of 1-methyl-2-ethyl-3-butylimidazolium bromide was used in lieu of N-methyl-N-butylpyrrolidinium iodide. 1-Methyl-2-ethyl-3-butylimidazolium dicyanamide (hereinafter abbreviated as MEBImDCA) was thus obtained (yield 12.3 g, 87%).

Example 3

Synthesis of N-methyl-N-butylpyrrolidinium thiocyanate

The procedure of Example 1 was followed in the same manner except that 10.1 g (61 mmol) of silver thiocyanate was used in lieu of silver dicyanamide. N-Methyl-N-butylpyrrolidinium thiocyanate (hereinafter abbreviated as MBPyTCA) was thus obtained (yield 11.2 g, 92%).

Example 4

The procedure of Example 1 was followed in the same manner except that 13.5 g of N-methyl-N-butylpyrrolidinium bromide was used in lieu of N-methyl-N-butylpyrrolidinium iodide and silver dicyanamide was used in an amount of 16 g. MBPyTCA was thus obtained.

Examples 5 to 7 and Comparative Examples 1 and 2

According to each formulation given in Table 1, the product of synthesis in Example 4 (MBPyDCA) was mixed up with lithium bistrifluoromethanesulfonylimide (hereinafter abbreviated as LiTFSI) in dehydrated tetrahydrofuran with stirring to give a homogeneous solution. The tetrahydrofuran was then removed under reduced pressure to give an electrolyte. As for comparative examples, N-methyl-N-butylpyrrolidinium bistrifluoromethanesulfonylimide (hereinafter abbreviated as MBPyTFSI) was used.

The results of evaluation of each electrolyte for ionic conductivity (at 60, 25, 0 and −20° C.; S/cm) and viscosity (25° C.; mPa) are also shown in Table 1. The ionic conductivity evaluation was made by the complex impedance method using Toyo Corporation's Impedance Analyzer HP4294A (trademark) with SUS electrodes. And the viscosity was measured using a model TV-20 cone/plate type viscometer (product of Tokimec Inc.).

TABLE 1

| | | Example 5 | Example 6 | Example 7 | Comparative Example 1 | Comparative Example 2 |
|---|---|---|---|---|---|---|
| Composition | MBPyDCA | 100 parts | 100 parts | 100 parts | — | — |
| | MBPyTFSI | — | — | — | 100 parts | 100 parts |
| | LiTFSI | — | 10 parts | — | — | 10 parts |
| | $H_2O$ | — | — | 0.1 part | — | — |
| Ionic conductivity ($\times 10^3$) | 60° C. | 12.0 | 9.5 | 19.0 | 3.6 | 2.4 |
| | 25° C. | 14.2 | 4.5 | 17.0 | 2.0 | 0.7 |
| | 0° C. | 5.9 | 1.5 | 8.2 | — | 0.2 |
| | −20° C. | 2.0 | 0.5 | 4.0 | — | 0.1 |
| Viscosity | | — | 60 | 20 | — | 136 |

Remarks are made to Table 1. MBPyDCA stands for N-methyl-N-butylpyrrolidinium dicyanamide synthesized in Example 4, MBPyTFSI for N-methyl-N-butylpyrrolidinium bistrifluoromethanesulfonylimide, and LiTFSI for lithium bistrifluoromethanesulfonylimide.

Example 8

Synthesis of Lithium Dicyanamide

A 300-ml autoclave was charged with 31.5 g (0.35 mol) of sodium dicyanamide, 10.0 g (0.24 mol) of lithium chloride and 140 g of tetrahydrofuran (hereinafter abbreviated as THF) and, while stirring the system inside with a stirrer, the autoclave was immersed in an oil bath at a temperature of 110° C. for 48 hours. Then, the matter insoluble in THF was filtered off, the volatile matter was removed using a rotary evaporator, and the residue was dried at 110° C. under reduced pressure for 5 hours to give lithium dicyanamide (yield: 14.6 g, 85%). Then, for purification, the product was recrystallized from acetonitrile to give white plates, which were dried at 120° C. under reduced pressure for 10 hours. Elemental analysis gave the following results: carbon: 32.8; nitrogen: 57.5; hydrogen: 0.1.

Example 9

A flask equipped with a thermometer, nitrogen gas inlet tube, reflux condenser, stirrer and dropping funnel was charged with 85 g (1.0 mol) of methylpyrrolidine and 400 g of 2-butanone (hereinafter referred to as MEK) and, while maintaining the temperature at 50° C. under a nitrogen stream, 205.5 g' (1.5 mol) of n-butyl bromide was added dropwise over 2 hours and, then, the temperature was maintained at 80° C. for 2 hours to drive the reaction to completion. Then, the reaction mixture was filtered to give N-methyl-N-butylpyrrolidinium bromide (hereinafter referred to as MBPyBr) as slightly yellowish white crystals. These crystals were then washed with MEK twice to give 187 g (yield 90%) of white MBPyBr.

Then, 89 g (1.0 mol) of sodium dicyanamide (product of Aldrich) was dissolved in deionized water, the insoluble matter was filtered off, and the filtrate was charged into a one-liter separable flask equipped with a thermometer, nitrogen gas inlet tube, reflux condenser, stirrer and dropping funnel, and stirred at 25° C. Then, an aqueous solution prepared by dissolving 169 g (1.0 mol) of silver nitrate in 360 g of deionized water was added dropwise over 1 hour, while maintaining the system inside temperature at or below 40° C. After completion of the dripping, the resulting mixture was further stirred for 3 hours and then suction-filtered to give cake-like AgDCA. This AgDCA had a solid content of 85%.

Then, a flask equipped with a thermometer, nitrogen gas inlet tube, reflux condenser and stirrer was charged with 92.7 g (0.45 mol) of the above-mentioned cake-like AgDCA and 300 g of deionized water, and dispersion was effected at room temperature. Then, a solution of 62.4 g (0.30 mol) of MBPyBr in 300 g of deionized water was added dropwise to the above aqueous dispersion of AgDCA over 2 hours, while the system inside was maintained at 30° C. or below. After completion of the dripping, the mixture was further stirred at room temperature for 24 hours. The precipitate was then removed by suction filtration (filter: membrane cellulose mixed ester type, pore diameter 0.2 μm), and the filtrate was deprived of the volatile matter at 50° C. and 10-200 mmHg using a rotary evaporator. The residue was then dried at 60° C. under reduced pressure for 3 days to give MBPyDCA.

Example 10

The procedure of Example 9 was followed in the same manner except that n-propyl bromide was used in lieu of n-butyl bromide. N-methyl-N-propylpyrrolidinium dicyanamide (MPPyDCA) was thus obtained.

Examples 11 to 12

Ionic conductors were prepared according to the formulations given in Table 2. In Examples 11, the materials were mixed up in dehydrated tetrahydrofuran with stirring to give a homogeneous solution and the tetrahydrofuran was then removed under reduced pressure to give an ionic conductor. In Example 12, the materials were mixed up to give an ionic conductor.

The results of evaluation of the electrolyte for ionic conductivity (at 60, 25, 0 and −20° C.; S/cm) and viscosity (25° C.; mPa) are also shown in Table 2. The ionic conductivity evaluation was made by the complex impedance method using Toyo Corporation's Impedance Analyzer SI1260 (trademark) with SUS electrodes. And the viscosity was measured using a model TV-20 cone/plate type viscometer (product of Tokimec Inc.). In Table 2, PC stands for propylene carbonate. The lithium dicyanamide was the product of synthesis in Example 8, and the MBPyDCA was the product of synthesis in Example 9.

TABLE 2

|  |  | Example 11 | Example 12 |
|---|---|---|---|
| Composition | Lithium dicyanamide | 2.5 parts | 9 parts |
|  | MBPyDCA | 100 parts | — |
|  | PEO | — | — |
|  | PC | — | 100 parts |
| Ionic conductivity ($\times 10^3$) | 60° C. | 18 | 3.0 |
|  | 25° C. | 8.8 | — |
|  | 0° C. | 3.2 | — |
|  | −20° C. | 1.0 | — |
| Viscosity |  | 47 | — |

Example 13

Preparation of ionic conductor (1): An electrolyte solution (1) was prepared by dissolving lithium hexafluorophosphate ($LiPF_6$), to a concentration of 1 mole/L, in a nonaqueous solvent composed of ethylene carbonate and ethyl methyl carbonate in a volume ratio of 1:1. To this electrolyte solution (1) was added lithium dicyanamide ($LiN(CN)_2$) in a mass ratio of 1/34 to $LiPF_6$ dissolved in the electrolyte solution (1). After complete dissolution, an ionic conductor (1) was obtained.

Figure 4:
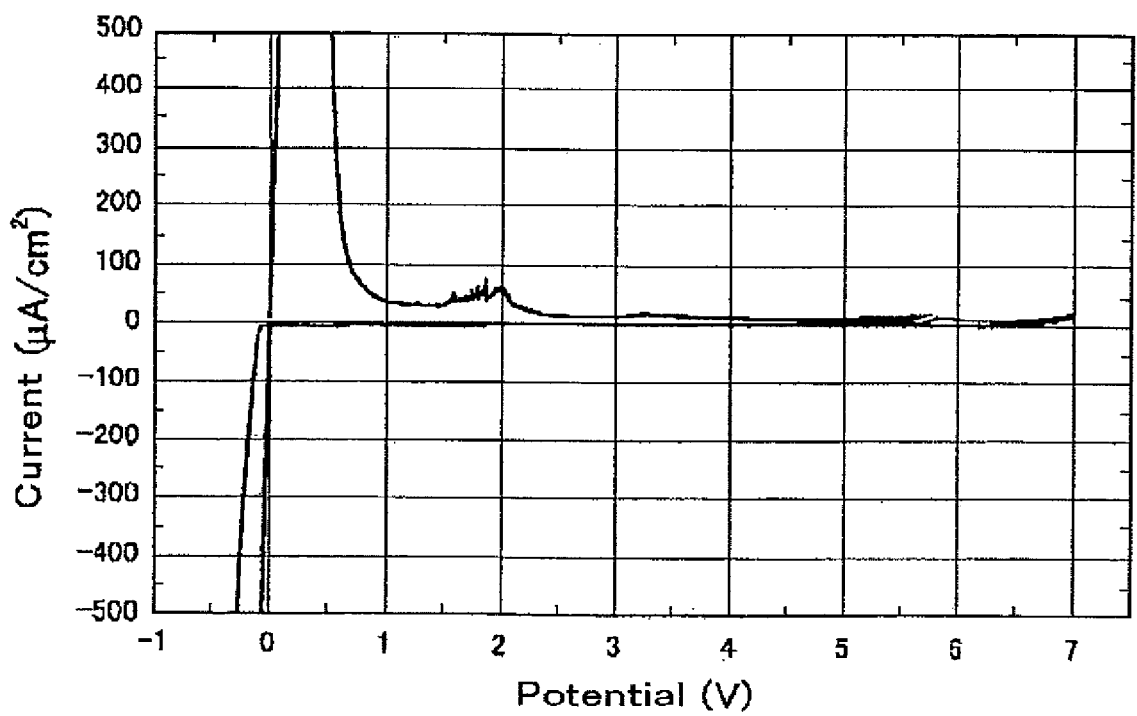
FIG. 4 is a graphic representation of the results of cyclic voltammetry as obtained in Example 13.

This ionic conductor (1) was subjected to cyclic voltammetry. The measurement cell used was a SUS stainless steel-made closed type one in which nickel was used as the working electrode and metallic lithium as the counter electrode and reference electrode. The working electrode potential was swept forth and back in the range of −0.5 to 7.0 V against $Li/Li^+$ at a rate of 2 mV/sec, and the current data were collected in that potential range. The measurement results indicated, as shown in FIG. 4, that this ionic conductor (1) is electrochemically stable without allowing any current to flow at high potentials from 4 V to 7 V against $Li/Li^+$.

Example 14

Preparation of ionic conductor (2): An electrolyte solution (2) was prepared by dissolving lithium bistrifluoromethanesulfonylimide ($LiN(SO_2CF_3)_2$) to a concentration of 1 mole/L, in a nonaqueous solvent composed of propylene carbonate and dimethoxyethane in a volume ratio of 1:1. To this electrolyte solution (2) was added lithium dicyanamide ($LiN(CN)_2$) in a mass ratio of 1/40 to $LiN(SO_2CF_3)_2$ dissolved in the electrolyte solution (2). After complete dissolution, an ionic conductor (2) was obtained.

Figure 5:
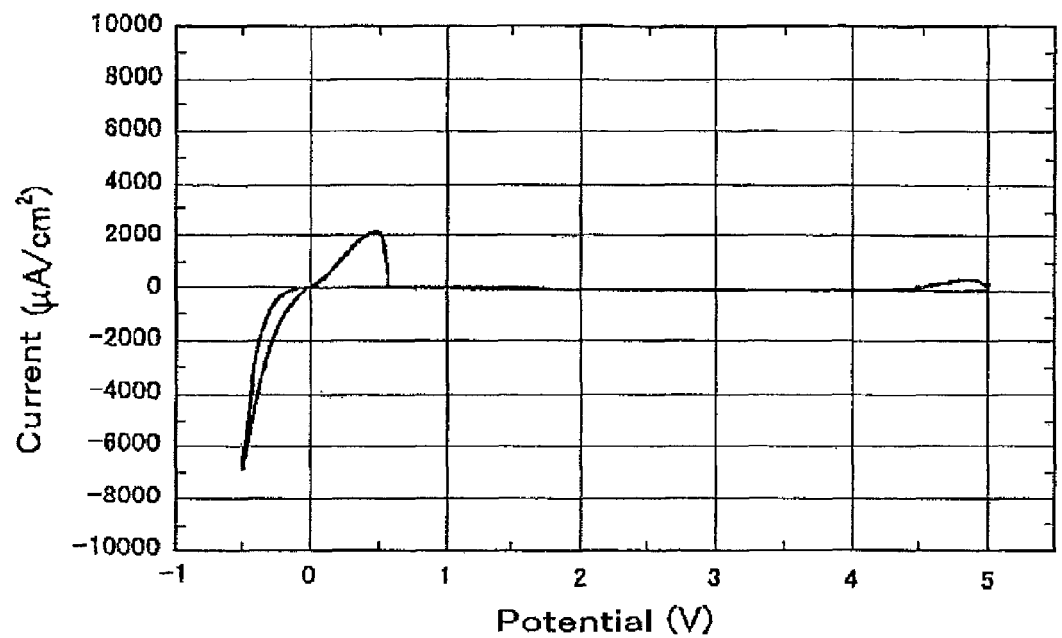
FIG. 5 is a graphic representation of the results of cyclic voltammetry as obtained in Example 14.

Using this ionic conductor (2), the same cell as used in Example 13 was constructed, and the working electrode potential was swept forth and back in the range of −0.5 to 5.0 V against $Li/Li^+$ at a rate of 2 mV/sec, and the current data were collected in that potential range. As shown in FIG. 5, it was revealed that this ionic conductor (2) is electrochemically stable without allowing any current to flow at high potentials from 4 V to 5 V against $Li/Li^+$.

Comparative Example 3

Ionic conductor (3): The electrolyte solution (1) used in preparing the ionic conductor (1) in Example 13 was used, as such, as ionic conductor (3).

Figure 6:
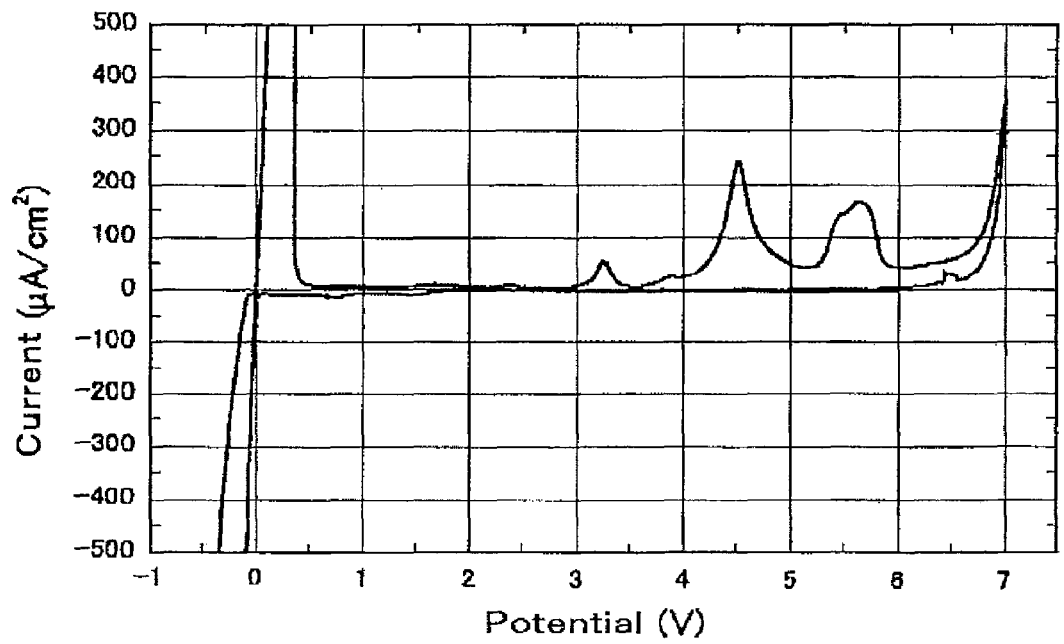
FIG. 6 is a graphic representation of the results of cyclic voltammetry as obtained in Comparative Example 3.

Using this ionic conductor (3), the same cell as used in Example 13 was constructed, and the working electrode potential was swept forth and back in the range of −0.5 to 5.0 V against $Li/Li^+$ at a rate of 2 mV/sec, and the current data were collected in that potential range. As shown in FIG. 6, it was revealed that this ionic conductor (3) is electrochemically unstable in the range of 4 to 7 V, allowing a relatively large current to flow in that potential range.

Comparative Example 4

Ionic conductor (4): The electrolyte solution (2) used in preparing the ionic conductor (2) in Example 12 was used, as such, as ionic conductor (4).

Figure 7:
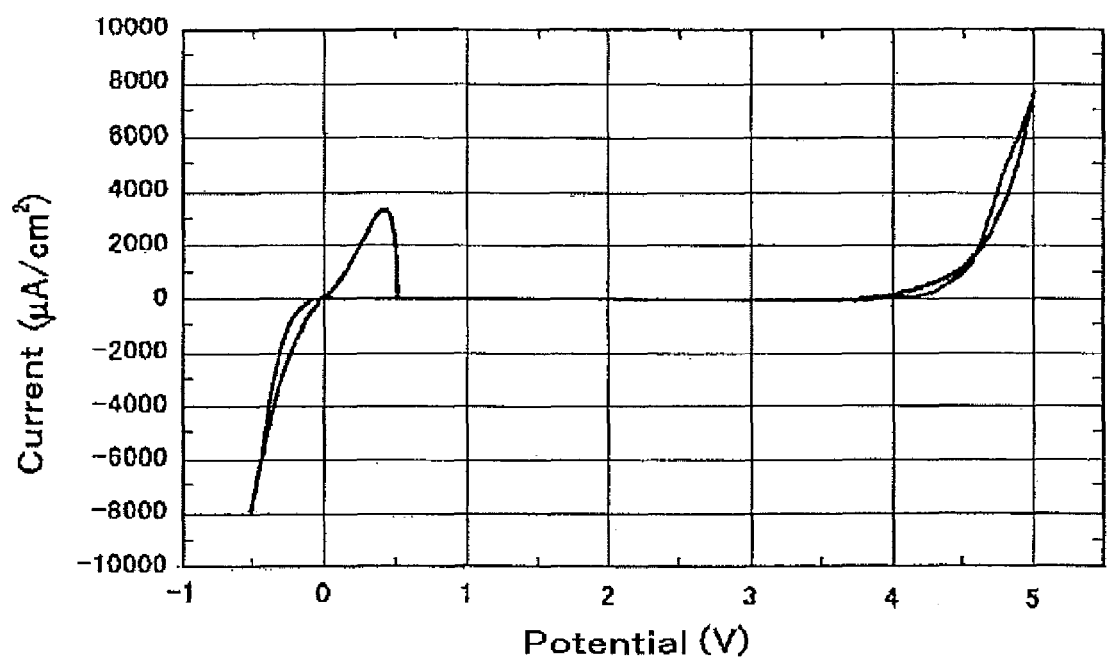
FIG. 7 is a graphic representation of the results of cyclic voltammetry as obtained in Comparative Example 4.

Using this ionic conductor (4), the same cell as used in Example 1 was constructed, and the working electrode potential was swept forth and back in the range of −0.5 to 5.0 V against $Li/Li^+$ at a rate of 2 mV/sec, and the current data were collected in that potential range. As shown in FIG. 7, it was revealed that this ionic conductor (4) is electrochemically unstable, allowing a large current to flow in that potential range.

From the above results, it was demonstrated that the electrolytes of the present invention have good ionic conductivity and are electrochemically stable at high potentials as well.

Example 15

Figure 8:
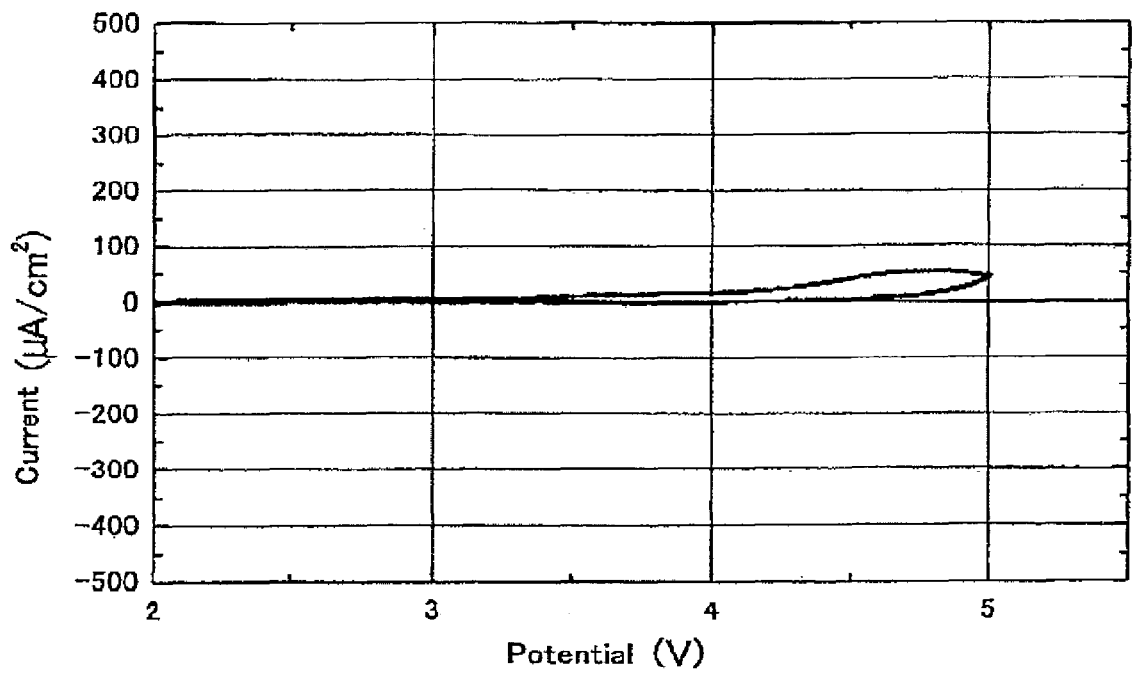
FIG. 8 is a graphic representation of the results of cyclic voltammetry as obtained in Example 15.

Preparation of material 1 for electrolytic solutions: To MBPyDCA synthesized in Example 4 was added lithium dicyanamide synthesized in Example 8 to an addition level of 0.35 mole/kg and, after complete dissolution, a material (material 1) for electrolytic solutions was obtained. This material 1 for electrolytic solutions was subjected to cyclic voltammetry. The measurement cell used was a SUS stainless steel-made closed type one in which nickel was used as the working electrode and metallic lithium as the counter electrode and reference electrode. The working electrode potential was swept forth and back in the range of 2.0 to 5.0 V against $Li/Li^+$ at a rate of 2 mV/sec, and the current data were collected in that potential range. The measurement results indicated, as shown in FIG. 8, that this material 1 for electrolytic solutions is electrochemically stable without allowing any large current to flow within the range of 4 V to 5 V against $Li/Li^+$.

Comparative Example 5

Figure 9:
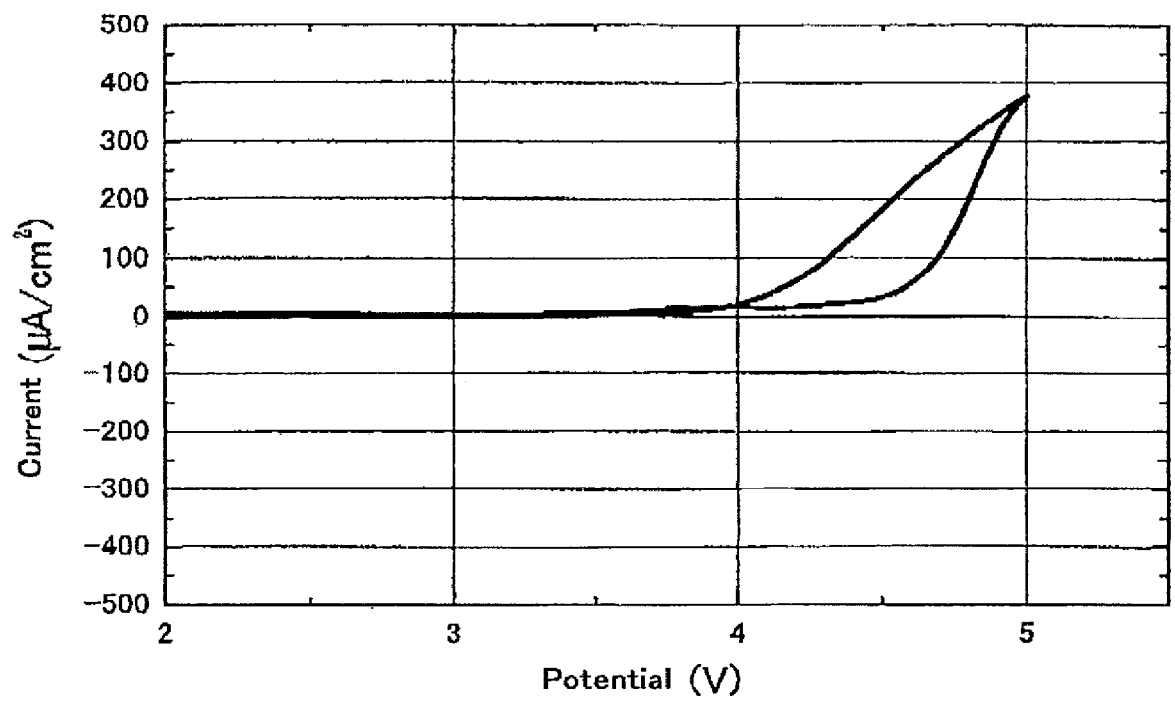
FIG. 9 is a graphic representation of the results of cyclic voltammetry as obtained in Comparative Example 5.

Preparation of material 2 for electrolytic solutions: To MBPyTFSI was added LiTFSI to an addition level of 0.35 mole/kg and, after complete dissolution, a material (material 2) for electrolytic solutions was obtained. Using this material 2 for electrolytic solutions, the same cell as used in Example 16 was constructed, and the working electrode potential was swept forth and back in the range of 2.0 to 5.0 V against $Li/Li^+$ at a rate of 2 mV/sec, and the current data were collected in that potential range. As shown in FIG. 9, it was revealed that this material 2 for electrolytic solutions is electrochemically unstable in the range of 4 to 5 V, allowing a relatively large current to flow in that potential range.

Example 16

Preparation of material 3 for electrolytic solutions: To MBPyDCA synthesized in Example 9 was added lithium dicyanamide synthesized in Example 8 to an addition level of 0.70 mole/kg and, after dissolution, a material (material 3) for electrolytic solutions was obtained.

<Positive electrode preparation> A slurry was prepared by mixing up 85% by weight of lithium cobaltate, 5% by weight of acetylene black (conductive material) and 10% by weight of polyvinylidene fluoride (binder) in N-methylpyrrolidone (solvent), and the slurry was applied to one side of a 20-µm aluminum foil, followed by drying. The thus-coated foil was further rolled on a pressing machine and then punched using a punch for a diameter of 12 mm.

<Negative electrode preparation> A 0.5-mm-thick lithium foil was punched using a punch for a diameter of 14 mm.

<Separator> A 20-μm-thick porous polyethylene membrane (Asahi Chemical Industry's Hipore N9620) was surface-treated on both sides using a corona surface treatment apparatus and then punched using a punch for a diameter of 15 mm.

<Battery assembly> A lithium secondary battery was constructed in an argon atmosphere dry box using a model CR 2032 coin cell. Thus, the positive electrode was placed on the positive electrode can, the separator corona-treated on both sides was placed further thereon and, after sufficient impregnation with the material 3 for electrolytic solutions, a polypropylene gasket was applied for pressing the whole, the negative electrode was then mounted, a spacer for thickness adjustment was placed thereon and, after sufficient reimpregnation of the cell inside with the material 3 for electrolytic solutions, the negative electrode can was mounted, and the battery was sealed.

<Battery evaluation> The thus-produced coin-type lithium secondary battery was subjected to charge and discharge (operating cycle) testing in the range of 4.2 V to 3.0 V at a constant current rate of 0.1 C. In the first cycle, the charged capacity was 140 mAh/g, the discharge capacity was 129 mA/g, and the cycle efficiency was 92%. It was thus found that the assembly can satisfactorily work as a lithium secondary battery.

INDUSTRIAL APPLICABILITY

The material for electrolytic solutions or ionic conductor material according to the present invention, which has the constitution described above, shows improved ionic conductivity, shows no corrosiveness against electrodes, among others, is stable in a time-independent manner, shows suppressed electrolyte salt decomposition even at high potential levels and is stable electrochemically as well and, therefore, is suited for use as a material for electrolytic solutions or ionic conductor material constituting ionic conductors and can judiciously be applied in cells or batteries having charge and discharge mechanisms, such as primary cells, lithium (ion) secondary batteries and fuel cells, as well as in other electrochemical devices, such as electrolytic capacitors, electric double layer capacitors, solar cells and electrochromic display devices.

The present application claims priority under 35 U.S.C. §119 to Japanese Patent Application No. 2002-100429, filed Apr. 2, 2002, entitled "IONIC CONDUCTORS IN WHICH THE NOVEL MOLTEN SALT IS USED.".

The contents of these applications are incorporated herein by reference in their entirety.

The invention claimed is:

1. A material for electrolytic solutions which comprises, as an essential constituent, an anion represented by the general formula (1):

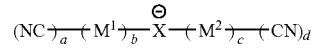

wherein X represents at least one element selected from among B, O, Al, Si, P, S, As, and Se; $M^1$ and $M^2$ are the same or different and each represents an organic linking group; a is an integer of not less than 1, and b, c and d each independently is an integer of not less than 0.

2. The material for electrolytic solutions according to claim 1 which further comprises an alkali metal salt and/or an alkaline earth metal salt.

3. A lithium secondary battery, electrolytic capacitor or electric double layer capacitor in which the material for electrolytic solutions according to claim 2, is used.

4. A lithium secondary battery, electrolytic capacitor or electric double layer capacitor in which the material for electrolytic solutions according to claim 1, is used.

5. The material for electrolytic solutions which comprises an ionic liquid and an alkali metal salt and/or an alkaline earth metal salt and in which the mixture of the ionic liquid and the alkali metal salt in said material for electrolytic solutions shows a viscosity of not higher than 300 mPa·s, wherein the ionic liquid comprise an anion represented by the general formula (1):

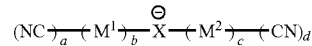

wherein X represents at least one element selected from the group consisting of B, O, Al, Si, P, S, As and Se; $M^1$ and $M^2$ are the same or different and each represents an organic linking group; a is an integer of not less than 1, and b, c and d each independently is an integer of not less than 0.

6. A lithium secondary battery, electrolytic capacitor or electric double layer capacitor in which the material for electrolytic solutions according to claim 5, is used.

* * * * *